United States Patent [19]

Safford

[11] 4,187,392

[45] Feb. 5, 1980

[54] SYNCHRONOUS UNIVERSAL BINARY SCRAMBLER

[75] Inventor: Laurance F. Safford, Washington, D.C.

[73] Assignee: American Standard Inc., New York, N.Y.

[21] Appl. No.: 200,995

[22] Filed: Jun. 8, 1962

[51] Int. Cl.² .............................................. H04L 9/02
[52] U.S. Cl. ................................................... 178/22
[58] Field of Search ............................ 178/22; 325/32; 179/15 AP, 15 BS

[56] References Cited

U.S. PATENT DOCUMENTS

| 2,898,402 | 8/1959 | Cory | 178/22 |
| 3,051,783 | 8/1962 | Hell et al. | 178/22 |
| 3,065,303 | 11/1962 | Kaneko | 179/15 AP |

*Primary Examiner*—Richard A. Farley
*Attorney, Agent, or Firm*—John P. Sinnott; Robert G. Crooks

EXEMPLARY CLAIM

1. A synchronous binary cryptographic system responsive to an input synchronous telegraph signal comprising means for generating timing pulses of substantially fixed, predetermined frequency, means for generating a synchronous binary cryptographic key in synchronism with timing pulses applied thereto by said means for generating timing pulses, switch means actuated by a predetermined input signal sequence for applying the timing pulses to said means for generating the binary cryptographic key, said cryptographic key generating means being continuously responsive to said timing pulses during operation of the system and means for combining said input signal with the cryptographic key.

44 Claims, 9 Drawing Figures

SYNCHRONOUS UNIVERSAL BINARY SCRAMBLER

The present invention relates generally to cryptographic telegraphy systems and more particularly to a synchronous, full-duplex transmitting and receiving cryptographic terminal-equipment capable of universal application to binary signals of constant rate.

At the present time the military uses special-purpose cryptographic systems for each specific communication requirement, and the number of types is continually increasing. This imposes an intolerable burden as regards finance, logistics, maintenance, and operation. There has been a long-felt military need for a "universal" binary cryptographic system that would handle all-types of synchronous telegraphic communications of the armed forces as well as all projected types of digital-data systems, plus all special types of communication (other than voice) that can be transmitted over a standard "voice-channel" (3 KC bandwidth in 4 KC channel-spacing) either in binary-digital form or through conversion to a complex-wave or phase-modulated wave form. The all-purpose synchronous binary cryptographic system (scrambler) must provide as a minimum the 38 bit-rates for the various systems and word rates presently developed.

Present types of synchronous cryptographic systems are deficient because they employ redundant components which add to their excessive cost. Because of their large size, existing systems are unsuited for field or sea use, thus restricting cryptographic telegraphy to permanent installations. Even after message transmission has been initiated a full time operator is required at the receiver to analyze traces of a costly, high grade oscilloscope which is generally permanently mounted on the equipment cabinet. Generally, present cryptographic equipment has very limited life, poor reliability and requires a great deal of maintenance since it employs many components having moving parts. Prior multiplex cryptographic systems have required the use of key tapes and have suffered all of the attendant disadvantages associated therewith.

Present types of multiplex and other synchronous communications apparatus (including crypto-equipments) derive their various output bit-rates from oscillators of non-standard frequency, which are often duplicated or triplicated. For example one available system utilizes an oscillator of 101.25 KC; another utilizes oscillators of 63 KC and 61-29/46 KC; a further apparatus has oscillators of 72 KC and 70-10/23 KC; and yet another equipment operates at 1.091250 MC. The engineering and logistic disadvantages of using oscillators of such peculiar frequencies are obvious, particularly when 40 or more bit-rates are to be derived, as in the present invention.

Accordingly, it is the primary object of the present invention to provide a synchronous "universal" binary cryptographic terminal-equipment that may be employed with all time-division multiplex systems utilized in the United States, all standard military digital-data systems, the Air Force SAGE system, the Navy Tactical Data System (NTDS), and other communications systems which transmit by telegraphic means or which sample, quantize, and transmit at synchronous bit-rates not exceeding 5 KC.

It is the second object of the present invention to provide a new and improved synchronous binary cryptographic unit that is simple, compact, light-weight, portable, rugged, reliable, free from redundant components, and relatively inexpensive.

It is the third object of this invention to provide a binary cryptographic equipment that is capable of unattended operation for prolonged periods of time and that does not require use of a high-grade oscilloscope in its operation.

It is the fourth object of the present invention to provide a binary cryptographic equipment that has no moving operating parts, such as phase-resolvers and relay-armatures, to promote long life, reliability and ease of maintenance.

It is the fifth object of this invention to provide a universal synchronous binary cryptographic equipment in which all the numerous bit-rates are derived from a single standard oscillator of one megacycle frequency.

It is another object of this invention to provide a new and improved synchronous binary cryptographic equipment wherein the unit is completely self-contained, requiring no additional parts to be inserted therein for unlimited use.

It is an additional object of the present invention to devise a new and improved synchronous binary cryptographic equipment that is completely safe for security purposes and in which there is absolutely no bias between generated mark and space signals.

It is a further object of this invention to provide a new and improved synchronous binary cryptographic terminal-equipment that is capable of generating a very large number of unique operating cycles which may be selectively employed and in which it is also possible to conveniently and rapidly preload the system with a great magnitude of different possible starting conditions.

It is a still further object of the invention to provide a synchronous binary cryptographic system wherein the transmitted enciphered signal is compared with the text input signal from the local time-division multiplex transmitter or other associated transmitting terminal equipment and in which automatic transmission of a continuous marking signal occurs when these signals are alike for a predetermined number of binary-digits and an alarm is accordingly actuated.

It is still yet another object of the present invention to provide synchronous binary cryptographic apparatus wherein the receiver contains means for automatically correcting the synchronism of the receiving key-generator to bring it back in step with the transmitting key-generator, in addition to provision for manual synch-correction.

It is an even still further object of the present invention to provide a synchronous binary cryptographic equipment with provisions for automatic starting and automatic phasing of the key-generators, in lieu of present manual starting and phasing methods.

Briefly, these objects are accomplished by this system with timing and phasing units comprising magnetic core elements that produce timing-pulses in accordance with selected constant-rate clock-pulses applied to them. The timing-pulses are applied to binary magnetic key generators to generate the cryptographic key signal which is combined with the input binary-signal in "Exclusive-OR" logical units commonly called binary half-adders or modulo-two adders. Clock-pulses at the desired transmission or receiving rate are derived from a 1 MC stable oscillator at nine different rates for currently available equipment.

The timing of the system is such that the transmitting portion of the local synchronous cryptographic telegraphy unit lags the associated multiplex-transmitter (or other terminal equipment), to which it is phase-locked, by one-half the time-length of a transmitted binary-digit ("i.e., bit"); in turn the receiving portion of the remote synchronous cryptographic telegraphy unit lags the associated local transmitting synchronous cryptographic telegraphy unit, to which it is also phase-locked, lags by 2½ bit-lengths; furthermore the remote multiplex-receiver (or other terminal equipment) is phase-locked to the receiving portion of the remote cryptographic unit by means of the multiplex circuitry which would otherwise phase-lock it to the associated multiplex-transmitter, and lags the line-signal by 2 or 2½ bit-lengths. Similar relationships hold for the remote transmitting equipments and local receiving equipments. This timing permits integrating and sampling the input binary signals in the middle of each baud, rather than relying on mark/space and space/mark transitions. Thus spurious pulses or noise cannot be falsely identified as a signal baud.

The actual ciphering or mixing process consists in reversing the Mark/Space polarity of half the "bits" or "bauds" of the input signal in a programmed, psuedo-random manner. A "ONE" binary-digit in the cryptographic-key causes polarity reversal: a "ZERO" binary-digit in the cryptographic-key or no key at all produces no reversal. The equipment cannot "scramble" the signal until an electronic-switch in the Key-generator timing circuit plus a manual-switch in the key-generator output circuit have been closed.

In the transmitting portion of the full-duplex system the electronic switch coupled between the timing unit and the key generator is closed in response to a locally generated signal indicating the start of the transmission cycle. In the receiver the corresponding switch is controlled by the same identical signal which has been transmitted over the telegraph circuits. The timing and phasing units of the transmitting and receiving portions of the system are separately enslaved to the input signals (i.e. locally and remotely generated telegraphy signals, respectively). The number of clock-pules per timing pulse is varied by automatically adding or deleting an occasional clock-pulse until the leading edges of the internally generated square-wave reference-signal and the input telegraphy-signal are in close coincidence.

The output signal of the key generator is combined with the input telegraphy signal representing ciphered or text information, respectively, in mixer circuits comprising conventional binary half-adders. In the transmitting portion of the system, the output signal from the mixer, normally representing cipher, is compared with the text signal for a predetermined number of timing-pulses and if they are identical an indication is provided to the operator that the system is malfunctioning and the system is also automatically prevented from producing "SPACE" signals.

The receiving unit is connectable as a transmitter to effect simultaneous transmission of two different messages from the same terminal-equipment, and the transmitting unit may be connected as a receiver in order to permit dual reception. The foregoing is necessary for the Navy Tactical Data System and sometimes desirable with other systems. Furthermore the local transmitting and receiving units may be coupled directly to each other for purposes of test.

Provision is made in the timing and phasing units for producing multi-speed timing-pulses: in this manner, 2, 3, 4, 8, 12 or 16 channel multiplex signals of Teletype and Rixon equipment may be handled at operating speeds of 60, 75, and 100 wpm. Furthermore the system provides the 600, 1200, 2400 and 4800 per second bit-rates required by the Department of Defense Digital-Data Systems, the 1360 and 2226 per second bit-rates required by the NTDS, and the 750, 1100 and 1300 per second bit-rates required by SAGE, may handle two-tone facsimile at 1,000 bits per second, and can work with other binary signals at a variety of speeds ranging from 37½ cps to 4800 cps, a ratio of 128/1.

The above and still further objects, features and advantages of the present invention will become apparent upon consideration of the following detailed description of one specific embodiment thereof, especially when taken in conjunction with the accompanying drawings, wherein.

Figure 2:
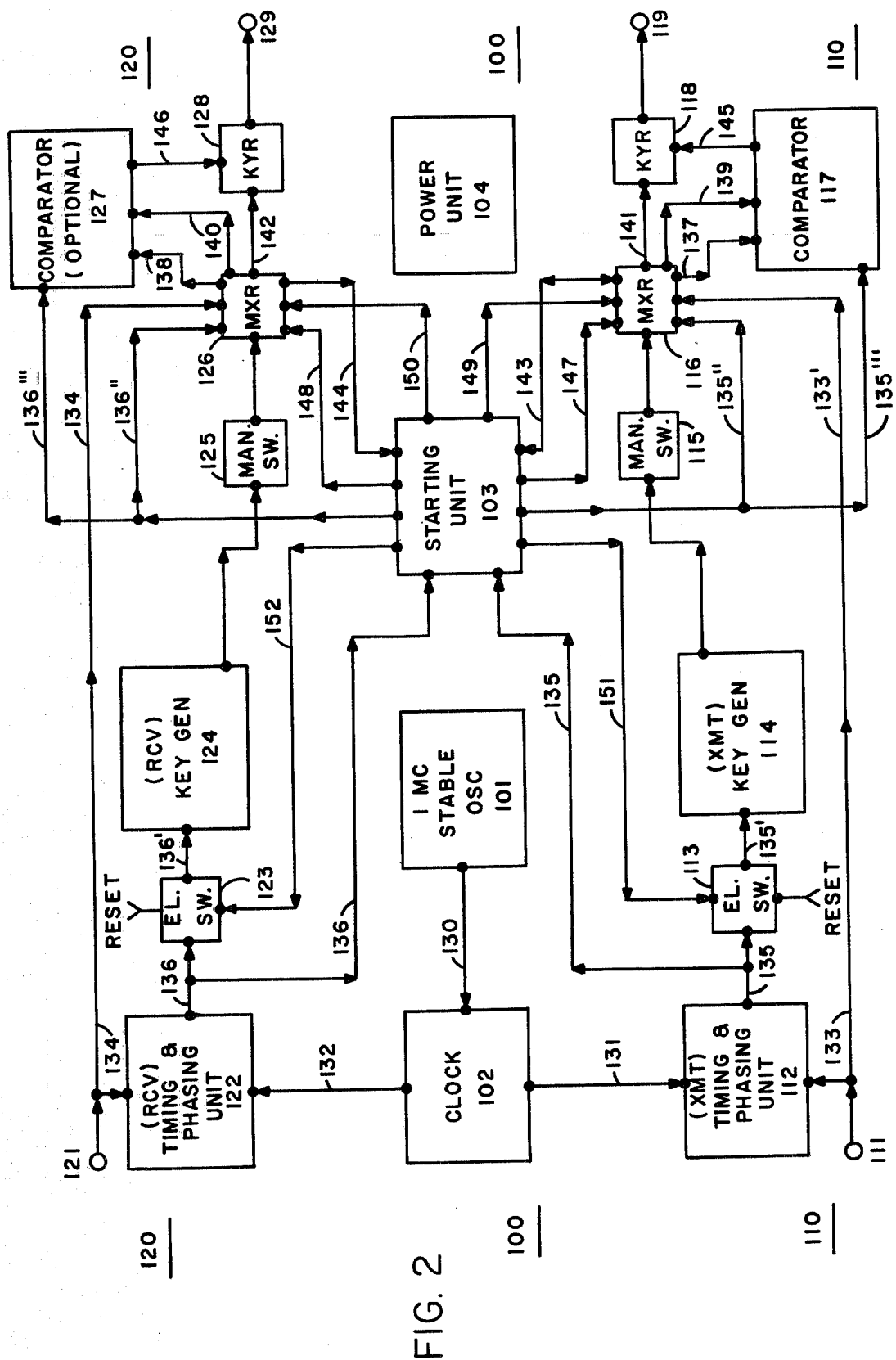
FIG. 2 is a block-diagram of a full-duplex terminal; according to the preferred embodiment of the present invention.
Figure 6:
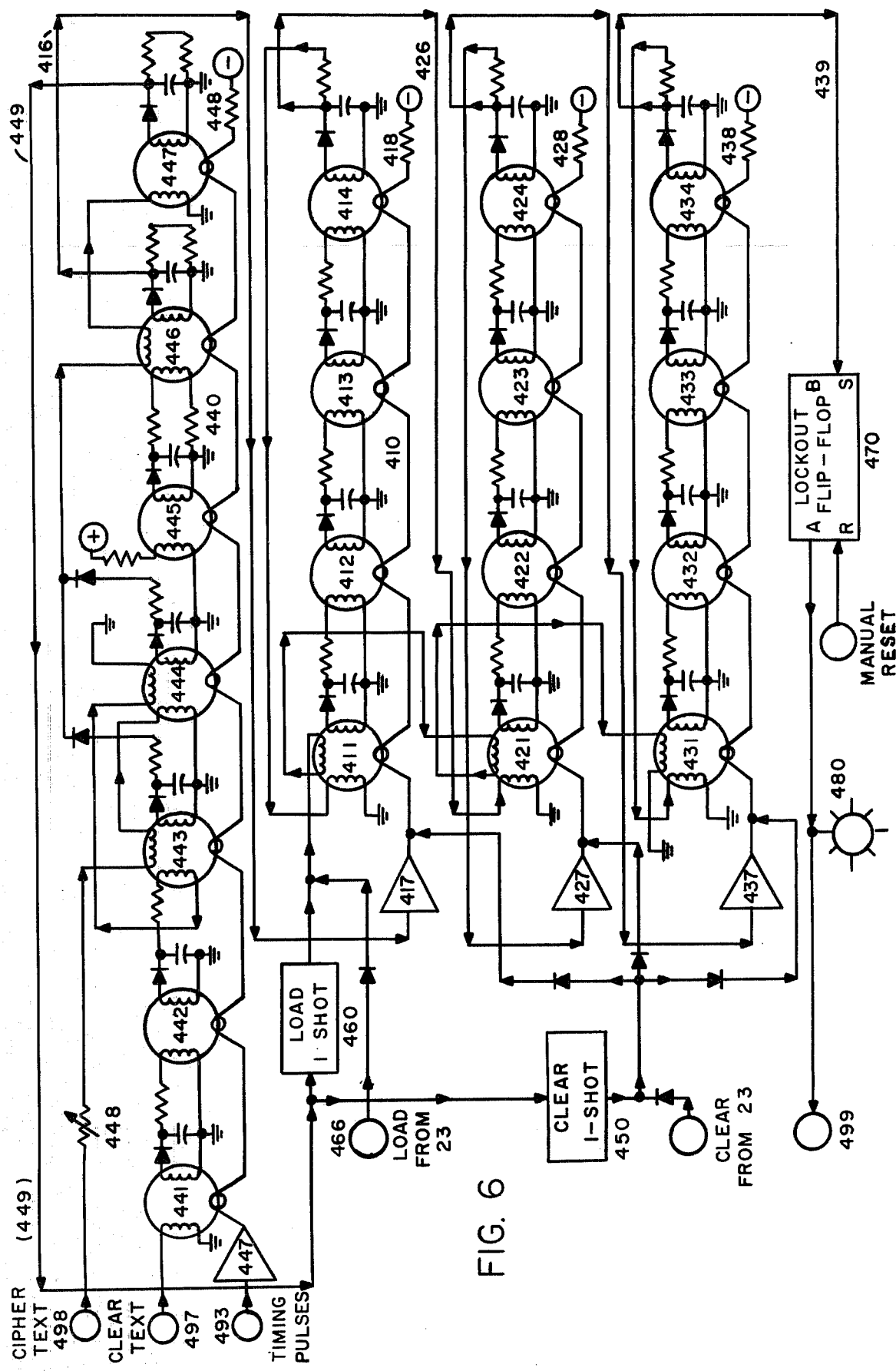
Figure 7:
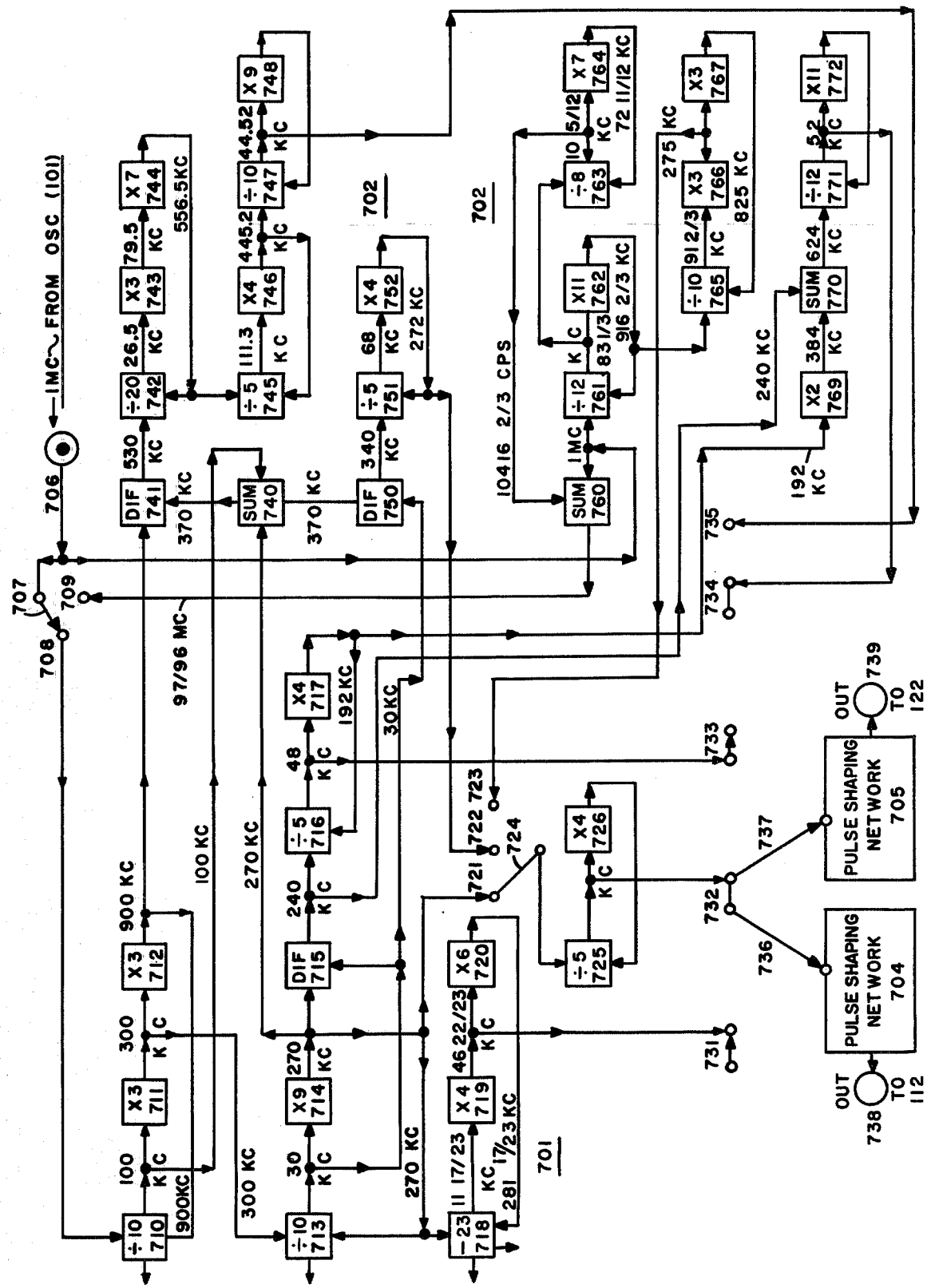
Figure 8:
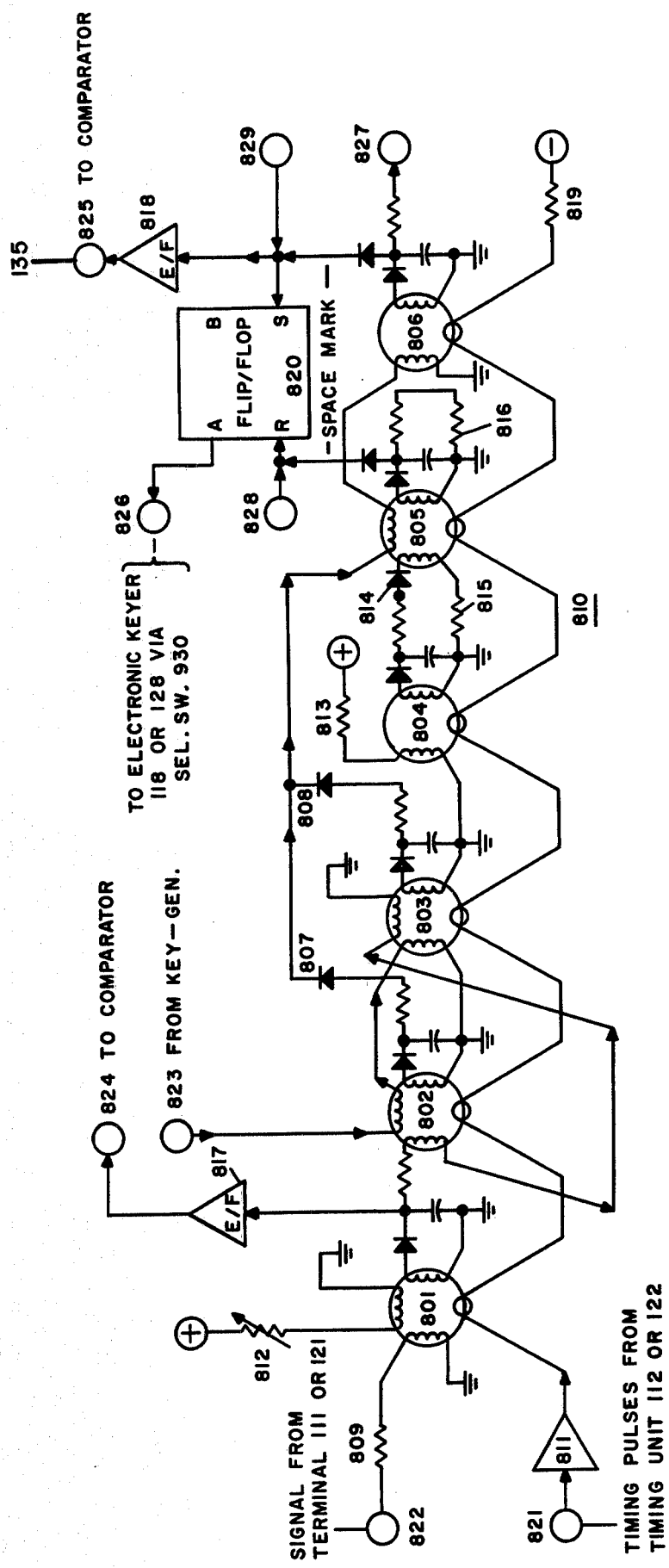

FIGS. are a 5 are block-diagram of the Key-generators of FIG. 2;

FIG. 6 is a schematic-diagram of the comparator of FIG. 2;

FIG. 7 is a block-diagram of the "clock" of FIG. 2;

FIG. 8 is a schematic-diagram of the ciphering mixers of FIG. 2; and

Figure 9:
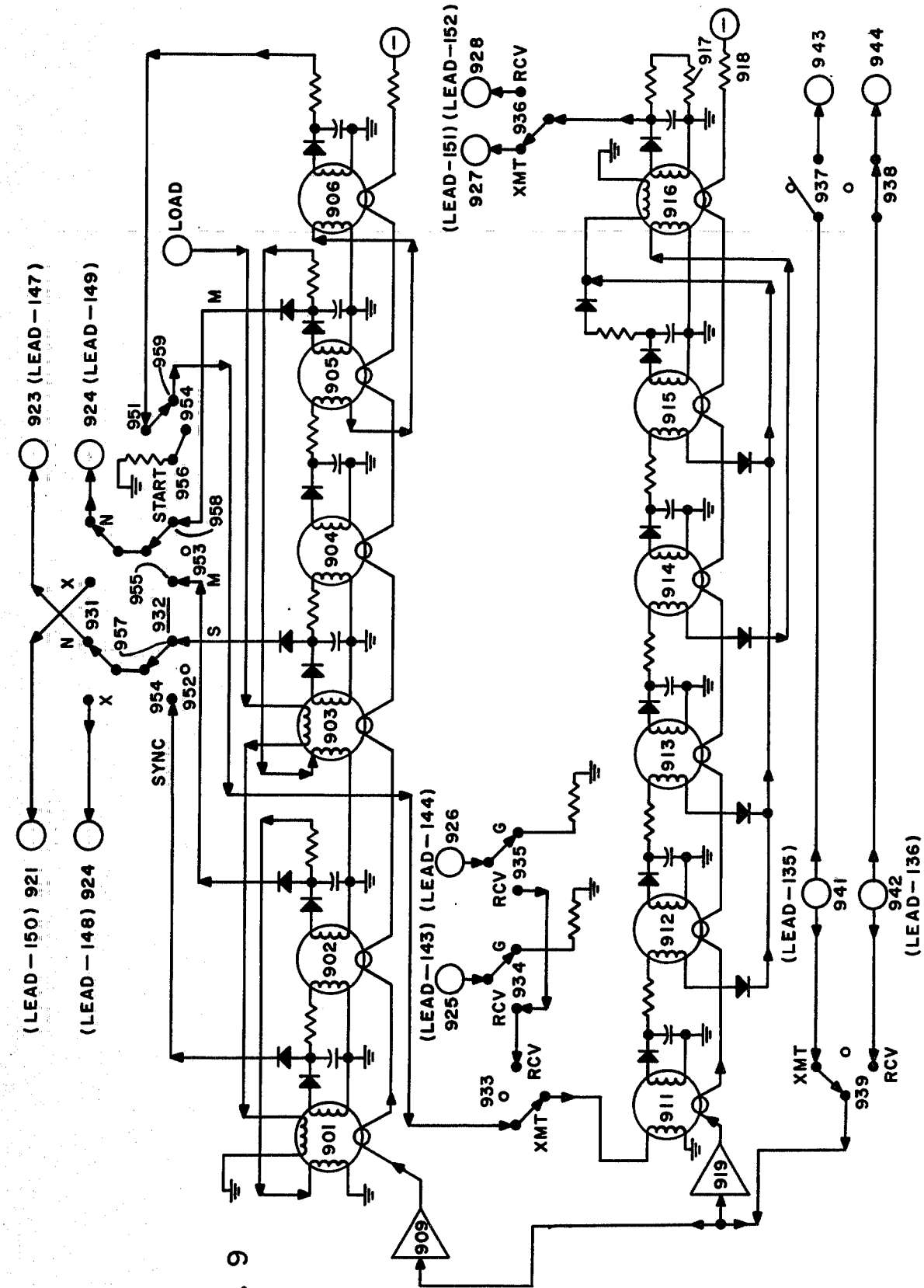

FIG. 9 is a schematic-diagram of the starting unit of FIG. 2.

Figure 1:
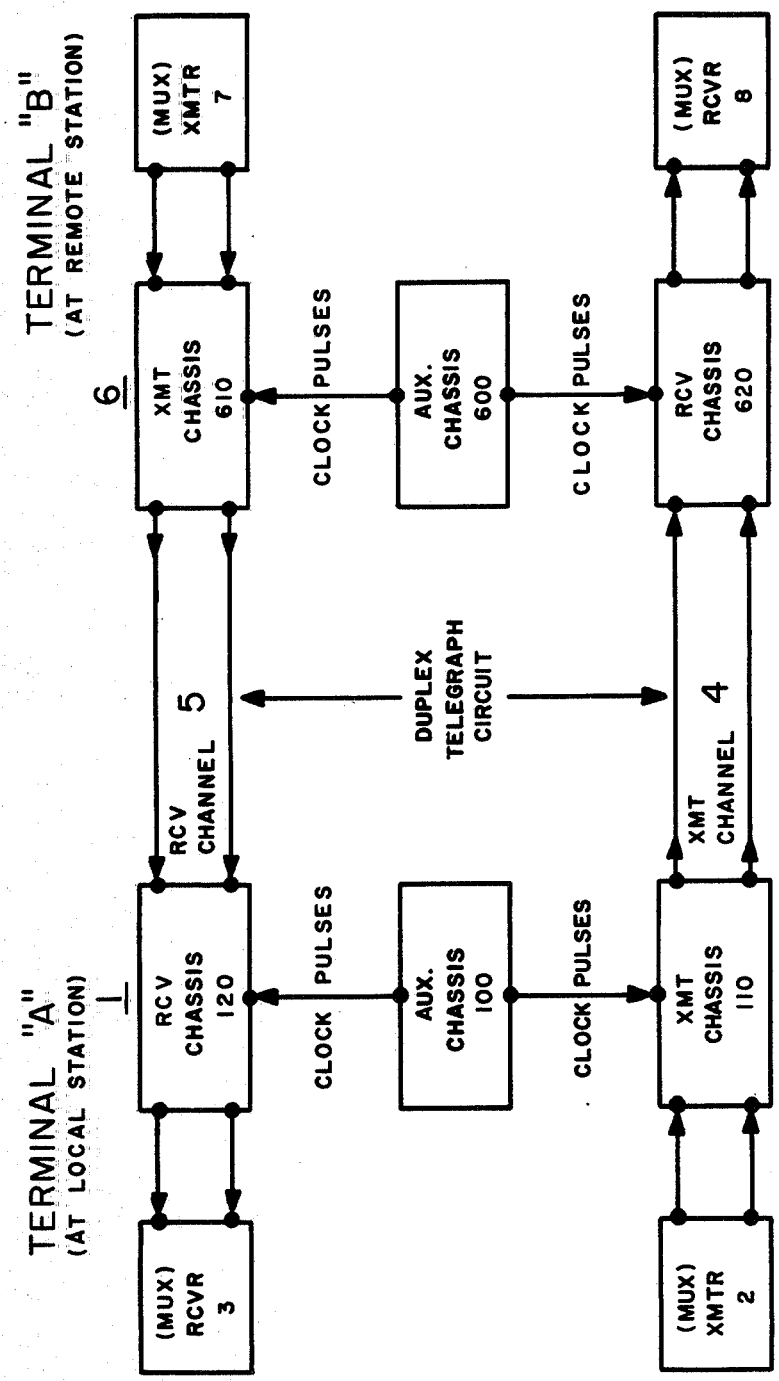
FIG. 1 is a system block-diagram showing a pair of equipments connected to a duplex telegraphic circuit.

FIG. 1, the system block-diagram, shows a pair of synchronous binary scramblers 1 and 6 connected in full-duplex manner to a 4-wire duplex telegraph circuit comprising a transmit channel 4 and a receive channel 5, as seen from the local station. The scramblers 1 and 6 are divided into 3 sections or chassis, namely:

Auxiliary Chassis 100 (and 600)
Transmit Chassis 110 (and 610) and
Receive Chassis 120 (and 620).

The Transmit Chassis 110 and 610 which encipher the plain language signal transmit sync and start signals are connected to multiplex transmitters (or other synchronous transmitting terminal-equipments) 2 and 7. The Receive Chassis 120 and 620 which decipher the transmitted signals are connected to corresponding multiplex receivers (or other synchronous receiving terminal-equipments) 3 and 8. The system is maintained in synchronism primarily by synchronous clock-pulses (stable to 1 part in 1,000,000) supplied from the Auxiliary Chassis 100 and 600.

The Auxiliary Chassis 100 and 600 supply regulated DC voltages to their asociated transmit and receive chassis and handle the function of automatic starting which is described infra. The Transmit and Receive Chassis 110 and 120 are identical in construction and may be considered as 4-terminal active networks or "black-boxes". Functionally, they are one-way regenerative synchronous telegraph-repeaters with the added feature that the polarities of one-half of the input bauds or "bits" (on the average) are reversed in a programmed, psuedo-random manner by the action of self-contained programmers known as "key-generators".

The normal condition of the system is continuous operation with all elements in exact synchronism. The system is shut-down and restarted only in case of a power-failure or when the transmission-speed (bit-rate) must be changed. The input clear-text signals from transmitting units 2 and 7 are scrambled within the transmit-chassis 110 and 610 by programmed polarity (mark or space) reversal of certain bauds, transmitted over the duplex telegraph circuit 4, 5 as unintelligible cipher text, and un-scrambled or restored to clear-text within the receive-chassis 120 and 620 by a duplicate polarity reversal of the same bauds, which restores them to their original polarities (mark or space).

The duplex telegraph circuit 4, 5 may include repeaters, conversion devices and relay circuits, including frequency-shift keying and two-tone modulation radio circuits, forward scatter circuits, phase-modulation, complex wave forms, etc. These are of no concern to the scramblers which "see" only the 4-wires of the transmit channel 4 and receive channel 5.

FIG. 2, the terminal block diagram of the preferred form of the invention, discloses the terminal A equipment as basically comprising the previously mentioned auxiliary chassis 100, transmitter chassis 110 and receiver chassis 120. As the latter two are identical in design, in construction, and in operation, despite their complementary functions, a detailed description of one is applicable to the other, and description of the local equipment 1 covers the remote equipment 6 as well. All the outputs of the auxiliary chassis 100 are shared by the Transmit Chassis 110 and the Receive Chassis 120 thereby effecting considerable simplification and economy since duplication found in most synchronous communication equipment presently available is obviated.

Transmitting/receiving chassis 110 and 120 are identical in design, construction, and operation as previously stated but interchanging the "line" and "loop" connections to their input and output terminals (111 and 119 or 121 and 129) reverses their functions as transmitting or receiving units.

The input binary signals from transmitting terminal-equipment 2 and line 5 are received at the input terminals 111 and 121 of chassis 110 and 120, respectively, and thence coupled via two-legged circuits 133 and 134 to the timing and phasing units 112 and 122, and the ciphering mixers 116 and 126. Clock-pulses of approximately 50 kc rate, with a selection from 9 clock-rates dependent on the apparatus with which the system is employed, are supplied to the timing and phasing units 112 and 122 over leads 131 and 132 from auxiliary chassis 100 comprising oscillator 101 and clock 102, described in connection with FIG. 7. As described infra, the timing and phasing units 112 and 122 generate timing-pulses from the clock-pulses supplied thereto from clock 102 by means of cascaded counting processes, and so adjust the phasing of the output timing pulses that these occur in the middle of the bauds or bits of the input binary signals to permit mark-space decisions by means of integration and sampling of the pulse middle rather than depending on mark/space and space/mark transitions of the input signals. Integration is frequently necessary to prohibit system actuation by noise and spurious pulses.

The output timing pulses from the timing and phasing units 112 and 122 are coupled via four-legged circuits 135 and 136, electronic switches 113 and 123 to the Key-generators 114 and 124, to the ciphering mixers 116 and 126, and to the comparators 117 and 127, and to the starting unit 103, respectively. The electronic switches 113 and 123 are normally conducting and serve no function except to simultaneously turn-on the key-generators 114 and 124 of the remote and local terminal by the automatic starting process. The output "key-streams" or "binary programs" from the key generators 114 and 124 are coupled to the ciphering mixers 116 and 126 via manual switches 115 and 125. The latter are normal conducting and serve no function except during automatic starting when they are opened and not closed again until it is certain that the start signal pattern has been sensed by both ends of the circuit.

The electronic switches 113 and 123 are manually reset, i.e. turned off, prior to initial synchronization and starting the terminals and are turned on by action of the starting unit 103 which is selectively coupled to the transmit switch 113 or to the receive switch 123 via leads 151 or 152. The two key-generators 114 and 124 are turned on separately by independent operations, thus sharing the circuits of the auxiliary chassis 100 and economizing on components. The local XMT key-generator and remote RCV key-generator are cut-in by the start pattern from the local terminal. The remote XMT key-generator and local RCV key-generator are cut-in by the start pattern from the remote terminal.

Integration and sampling of the input signals are performed within the ciphering mixers 116 and 126. The regenerated input signals, delayed ½ timing-pulse interval and converted from square-wave to pulse form in mixers 116 and 126, are distributed via circuits 137 and 138 to the comparators 117 and 127, and are used internally. The regenerated input signals are combined with the output signals from the key-generators 114 and 124 in binary half-adders or "exclusive-OR" circuits, described in detail, infra in connection with FIG. 8, and the resultant cipher outputs, for the transmit unit and clear-text for the receive-unit are coupled via leads 139 and 140 to the comparators 117 and 127, via leads 141 and 142 to the electronic keyers 118 and 128 and via leads 143 and 144 to the starting unit 103.

The keyers 118 and 128 reproduce at 120 volts and 60 milliamperes their input signal of about 10 volts and 1 milliampere. The preferred form for electronic keyers 118 and 128 is a conventional silicon power transistor rated at 120 volts and 60 milli-amperes or better, but cascaded transistors of lower voltage may be used, as well known by those skilled in the art. When a marking signal is being transmitted, keyer circuits 118 or 128 are turned "ON" and pass the 60 milli-ampere current of their respective circuits.

The output control signals from the comparators 117 and 127, indicative of system malfunction, are coupled via circuits 145 and 146 to the electronic keyers 118 and 128 where they turn "ON" the keyers which then transmit steady marking signals to the output terminals 119 and 129. The comparators 117 and 127 can be removed from the 110 and 120 chassis with no effect except to remove from the equipment important safety devices found in no other type of cryptographic apparatus. The comparators compare the cipher signal, resulting from mixing of the key stream signal and the input signal, with the text signal and produces a signal when they are alike for predetermined number of bits which indicates a very high probability of system malfunction. The signal provides a visual and aural warning to the operator and puts a steady marking signal on the transmit channel 4. Comparator 127 is employed only when signals are transmitted from both chassis 110 and 120.

Power unit 104 supplies all necessary voltages and currents to the various system elements, but no connections are illustrated for clarity.

Figure 3:
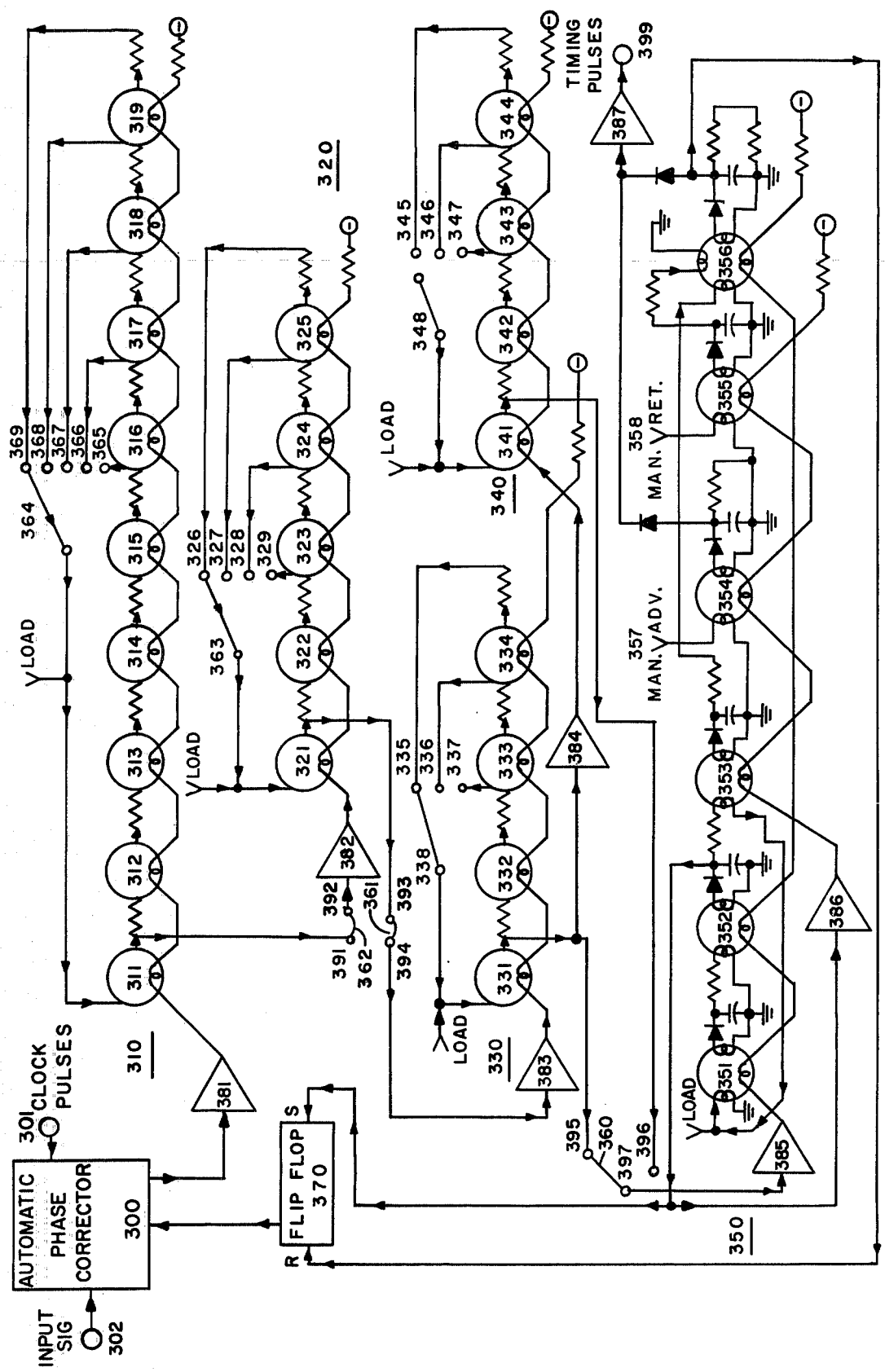
FIG. 3 is a schematic-diagram of the timing and phasing units of FIG. 2.

FIG. 3 discloses the preferred form of the timing and phasing units 112 and 122 employed in the transmitting and receiving chassis of the system disclosed in FIGS. 1 and 2. The two timing and phasing units are identical, comprising four ring-dividers 310, 320, 330 and 340 plus a modified "ring" 350 consisting of a magnetic flip-flop plus 4 manual corrector stages.

The timing and phasing unit includes 28 one-core-per-bit magnetic bistable-cores having substantially rectangular hystersis loops. The 9 cores of ring 310 must be capable of operation at 100 kc and are rated as high-speed cores but the other 19 cores need only operate up to 10 kc and are rated as low-speed cores, although high-speed cores can be used if preferred. With one exception, only 3 windings per core are required; "input", "output" and "drive" (or "advance" or "timing") which are shown on the drawing as being on the left, right and lower portions of each core, designated by a circle.

The automatic phase-correction unit 300 is normally inactive and transmits clock pulses from terminal 301 to the series connected drive windings of the cores of ring 310 via driver amplifier 381, which is preferably a transistorized unit. After initial synchronization it only has to compensate for the drift of the oscillator of the transmitter and receiver and oscillator 101 which rarely exceeds 2 parts in 1 million and is usually less.

Figure 4:
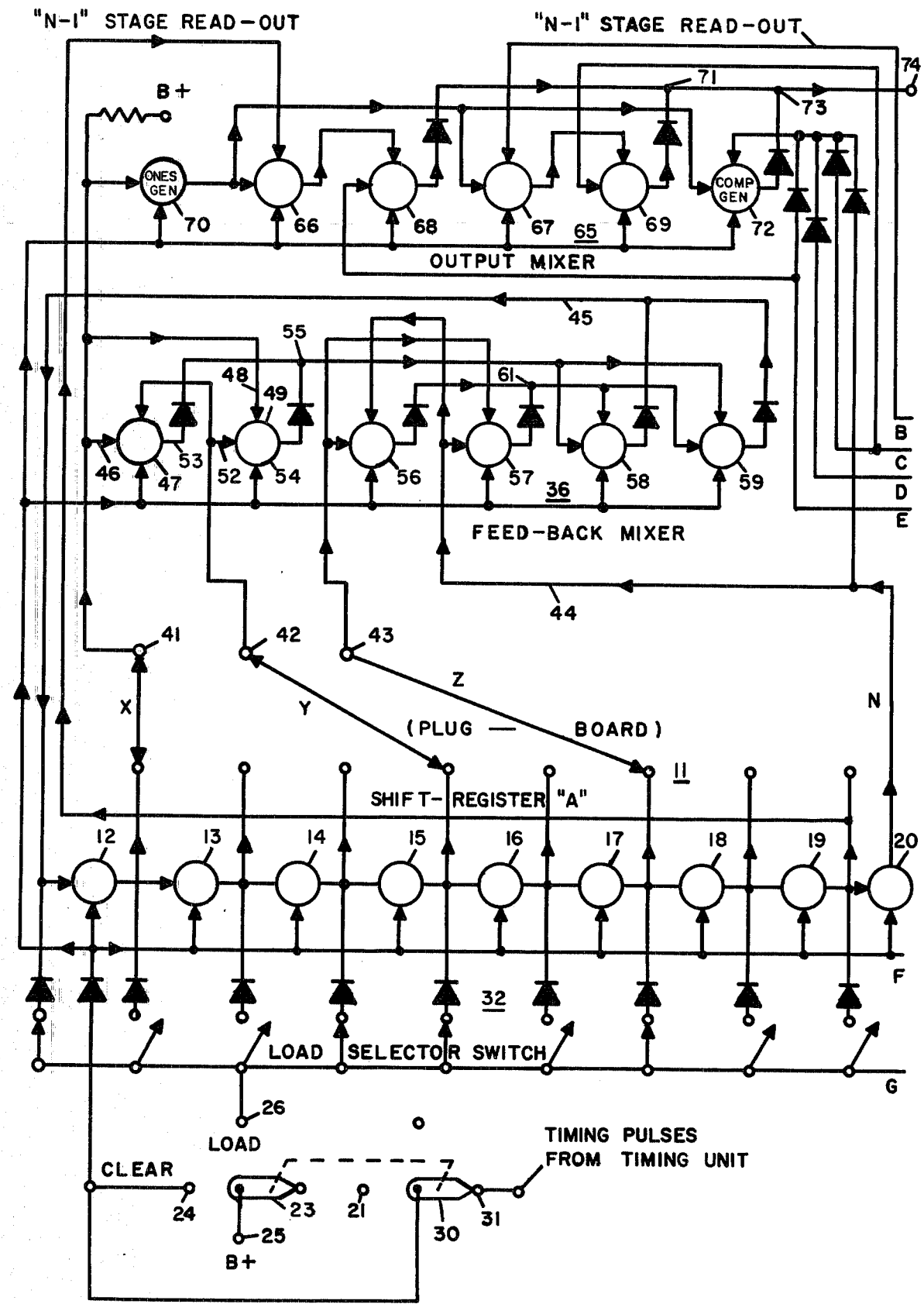

A preloaded binary one is loaded in core 311 in the manner seen in FIG. 4 and is shifted one core to the right with each successive drive pulse. By means of a 6 terminal receptacle and patch core 364 the current outputs of the 5th, 6th, 7th, 8th or 9th stages (cores 315, 316, 317, 318 or 319 respectively) are fed back into the input winding of stage #1 (core 311), thus forming a ring-divider or recirculating loop of 5, 6, 7, 8 or 9 effective stages. As illustrated, output current from core 319 is fed back to the input winding of core 311, via terminal 369 and patch core 364. Thus the pulsed voltage output of core 311 supplied to the series connected timing windings of the cores of ring 320 via amplifier 382 is a sub-multiple of the input clock pulses at terminal 301; the sub-multiple being determined by the position of lead 364 on terminals 365–369.

The other ring dividers 320, 330 and 340 are similar to ring 310 except they have only 5, 4 and 4 stages respectively and current feedback to the first stage is available from all stages but the first stage. Stages 343 and 344 of ring divider 340 are not presently needed but are added as a precaution against future requirements. The first stages 321 and 331 and 341 of these ring dividers provide the timing pulses for the subsequent ring divider and are preloaded from the clear-load-operate switch 23, FIG. 4. Instead of patch cords and jacks, selector switches of 5, 4, 3 and 3 positions respectively may be used for determining the number of effective stages, if desired. Patch cords 360, 361 and 362 are provided for excluding rings which may not be required for a given division. For example, FIG. 3 shows the 4th ring 340 jumped over and inoperative, the voltage readout from core 331, being coupled to the 350 unit driver 385 via terminal 395, patch cord 360, and terminal 397. If it is desired to exclude ring 320 cord 361 is connected between terminals 391 and 394 rather than between terminals 394 and 393, as illustrated.

Details of the division process are given infra. Regardless of what process is used, the input pulse rate to the driver 385 must be exactly twice the required output bit-rate. The final reduction to the bit rate is accomplished in the magnetic flip-flop stages 351 and 352 plus the "retard" correction stage 356. Voltage outputs from cores 352 and 356 are coupled to the set and reset input terminals of (transistor) flip-flop 370, thereby generating a square-wave reference signal at the output bit rate, and this reference signal is coupled to the automatic phase corrector unit 300 for comparison with the input signal on lead 302. The voltage readout from core 356 is connected to the output terminal 399 via an isolating diode and amplifier 387, and furnishes synchronous timing pulses to the other components of this equipment at the required bit rate.

Basically, the first two rings 310 and 320, reduce the input clock-rate of approximately 50 kc to twice the required output bit-rate if the latter is for a 600 cps (or higher), high-speed single channel system or to twice the output bit rate for 16 channel-multiple and integral fractions thereof, and to four times the output bit rate for 12 channel multiplex. The next two rings 330 and 340 handle the division from 16 channel to 8, 4, 2 and 1 channel synchronous bit rates, but are not used for high speed data systems etc. Rings 330 and 340 also provide a divide-by-two reduction for 12 channel multiplex and a divide-by-eight reduction for 3 channel multiplex. The required pulse frequency division processes are listed in Table 1, infra, for all of the present and prescribed military telegraphy and digital processing system speeds and multiplex channels.

| PULSE FREQUENCY DIVISION PROCESSES FOR AVAILABLE TIME-DIVISION MULTIPLEX SYSTEMS | | | | |
|---|---|---|---|---|
| OPERATING SPEEDS | | 60 WPM | 75 WPM | 100 WPM |
| CLOCK-RATES | MUX systems Teletype | 54 KC | 54 KC | 46–22/23 KC |
| Pulse at terminal 301 | Rixon | 54–9/16 KC | 54–9/16 KC | 47–41/92 KC |
| RING NOS. | | 1 2 3 4 | 1 2 3 4 | 1 2 3 4 |
| No. Channels | | (EFFECTIVE STAGES) | | |
| 16 | | 9 5 - - | 9 4 - - | 6 4 - - |
| 12 | | 6 5 2 - | 6 4 2 - | 4 4 2 - |
| 8 | | 9 5 2 - | 9 4 2 - | 6 4 2 - |
| 4 | | 9 5 4 - | 9 4 4 - | 6 4 4 - |
| 3 | | 6 5 4 2 | 6 4 4 2 | 4 4 4 2 |
| 2 | | 9 5 4 2 | 9 4 4 2 | 6 4 4 2 |
| (1) | | 9 5 4 4 | 9 4 4 4 | 6 4 4 4 |

| HIGH-SPEED SINGLE-CHANNEL SYSTEMS | | | | |
|---|---|---|---|---|
| BIT-RATE | SYSTEM | CLOCK-RATES | RING NOS. 1 2 3 4 | |
| 4800/Sec | DDDS | 48 KC | 5 - - - | |
| 2400/Sec | DDDS | 48 KC | 5 2 - - | (Effective Stages) |
| 2226/Sec | NTDS | 44.52 KC | 5 4 - - | |
| 1360/Sec | NTDS | 54.4 KC | 5 4 - - | |
| 1300/Sec | SAGE | 52 KC | 5 4 - - | |
| 1200/Sec | DDDS | 48 KC | 5 4 - - | |
| 1100/Sec | SAGE | 55 KC | 5 5 - - | |
| 1000/Sec | Facsimile | 48 KC | 8 3 - - | |
| 750/Sec | SAGE | 48 KC | 8 4 - - | |
| 600/Sec | DDDS | 48 KC | 8 5 - - | |

The automatic phase-corrector unit 300 is well known and does not require detailed disclosure herein. As shown in FIG. 3, clock pulses are coupled to phase-corrector 300 via input terminal 301 and normally pass through undisturbed to the first stage driving unit 381. The incoming signal from the line or the associated local transmitting unit is coupled to phase-corrector 300 via input terminal 302: the internally generated square-wave reference signal from flip-flop 370 is also coupled to automatic phase corrector unit 300.

The 300 unit senses the space-to-mark transitions of the incoming signal which are better defined and more stable than the mark-to-space transitions and compares them with the leading edge of the square wave reference signal from flip-flop 370. To avoid jitter the 300 unit is so designed and so biased that there is a narrow zone of no correction amounting to about 5% of a bit-length (i.e. baud-length) at the leading edge of the square-wave reference signal. If the space to mark signal transition is separated from the leading edge of the flip-flop square wave, phase corrector 301 automatically changes the timing pulse phase to coincide with that of the input signal in a well known manner. After initial synchronization, the space/mark transition should "ride" within this neutral zone, hour-after-hour.

When the transition falls outside this neutral zone a correction is made. If within the MARK half of the reference square wave the scrambler has drifted "ahead" of the incoming binary signal, and the scrambler must be retarded; therefore a one-shot multivibrator whose period is one and one half clock pulse intervals is triggered, and serves to inhibit the next clock pulse. If within the SPACE half of the reference square wave, the scrambler has drifted "behind" the incoming binary signal the scrambler must be advanced; therefore a one-shot multivibrator whose period is one-half clock pulse intervals is triggered, and injects an extra "clock" pulse half way between the normal clock pulses from the clock 102. To combat jamming and bad multipath conditions, the automatic phase corrector 300 can be bypassed by a manual switch (not shown) which excludes corrector 300 from the circuit and couples clock pulse terminal 301 directly to 381.

During initial synchronization there is always the possibility that the receiving scrambler will "phase-in" one-bit behind or one-bit ahead of the transmitting scrambler. There is also the remote possibility that the receiving scrambler may not correctly receive the transmitted "start pattern" until the second or third repetition thereby starting 1, 2 or more pattern lengths behind the transmitter. To overcome such out of phase relationship, a manual corrector system comprising cores 354 and 355 is provided which advances or retards the receiving key-generator, by adding or deleting one timing pulse at a time.

The voltage readout of magnetic flip-flop stage 352 is coupled to a driving amplifier 386 which drives the timing windings of manual corrector cores 353, 354 and 355 at the output bit-rate at terminal 399 but 180 degrees out of phase with the normal timing pulses. Cores 354 and 355 are normally not loaded are therefore readout ZEROS in response to the pulses from amplifier 386. Core 354 is loaded by operation of the manual advance loading circuit 357, when the operator believes the local clock pulse source is behind the received signal. The next drive pulse from driver 386 reads out a voltage pulse from core 354 which is coupled to the timing pulse terminal 399 via an isolating diode and amplifier 387. This serves to inject an extra timing pulse half-way between two normal timing-pulses because of the out of phase relationship of the pulses from amplifier 386 and advances the associated key-generator 114 by 1 bit.

Core 353 is a buffer stage which is loaded (in series with 351) by current readout from core 352. Core 355 is loaded by operation of the manual retard loading circuit 358, which is activated when the operator believes the local clock pulse source is ahead of the received signal. The next drive pulse from driver 386 reads out a current pulse from core 355 through the inhibit winding of core 356 and reads out a current pulse from buffer stage 353 through the input winding of core 356, but the core 355 readout through the inhibit winding blocks the loading of core 356. Core 356 normally reads out alternate ONE's (in phase with the output signal) and ZERO's (out of phase with the output signal) voltage pulses to timing pulse terminal 399, via an isolating diode and amplifier 387 in response to the signal from amplifier 385, which is twice the frequency of the signal applied to the input winding from buffer core 353. When a load is inhibited, core 356 reads out three ZERO's in a row in response to the signal applied to its timing winding, thereby dropping one timing pulse and retarding the associated key-generator by 1 bit.

Figure 5:
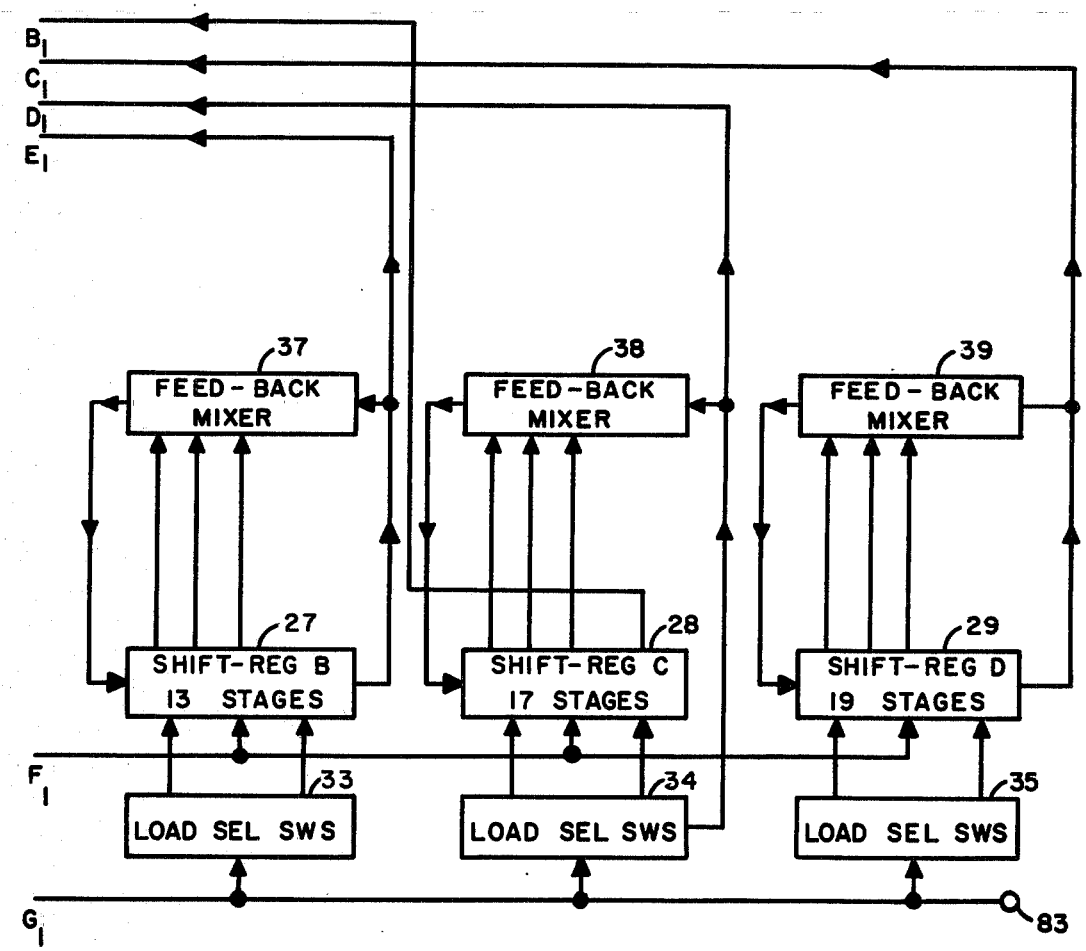

In FIGS. 4 and 5 of the drawings, unless otherwise indicated, each circle is indicative of a magnetic core binary logical element and the leads coupled thereto are connected to respective core windings. Driving pulse signals are fed to the cores by the lead connected to the bottom of each core. An input pulse on the lead connected to the lefthand side of each core will normally result in an output pulse on the lead connected to the righthand side at the next time a driving pulse is applied to the core. PUlses applied to the upper input terminal of each core, as shown on the drawings, serve to block or inhibit the generation of an output pulse on the righthand output lead, even when a pulse is generated on the lefthand input lead.

Thus, it should be apparent that the leads emanating from the bottom, left, top and right of each circle may be considered as connected to the timing, input, inhibit, and output windings, respectively, of a particular core.

It will be understood, therefore, that each core and its associated circuitry serves as an inhibit or "not" binary logical circuit. A logical "or" circuit which produces an output signal of "one" polarity when any or all of the input signals applied thereto are of the "one" polarity is formed by feeding the output signals of two or more binary core circuits through separate diodes and connecting the diodes together at a single terminal. In Boolean algebra terminology it is the general practice to designate an "or" operation by the symbol +. A binary "and" circuit is formed by cascading the output signals of two magnetic core circuits, i.e. applying the output signal of a first core to the inhibit terminals of a second core and applying a first signal to the inhibit winding of the first core and a second signal to the standard input winding of the second core. In Boolean algebra terminology the "and" operation signifies that all of the input signals applied to a particular stage must be equal to "one" in order to obtain a "one" output signal. The "and" function is normally represented by the multiplication of two variables.

FIGS. 4 and 5 of the drawings, a schematic representation of the key generators 114 and 124, comprises a shift register 11 having nine magnetic cores 17 20. Each of these cores is simultaneously supplied with driving or timing pulses from amplifier 387. The driving pulses cuase the stored signal state in each stage to be transferred to the succeeding stage to which it is connected. Each stage of the shift register comprises a standard bistable magnetic core, an associated temporary storage capacitor and suitable pulse shaping and delaying networks between it and the next stage. Since this shift register construction is well known in the art it is not deemed necessary to explicitly disclose the circuitry employed.

Prior to the operation of the device, spring biased switch 23 is manually brought into contact with terminal 24. Thus the B+ source coupled to terminal 24 by way of terminal 25 and switch 23 applies a prolonged advance pulse to all of the cores of the system. This pulse switches all of the cores to the "zero" state and holds them in this condition while the associated temporary storage capacitors are discharged through the input windings of the next core. This erases any "ones" previously stored in the cores in a manner well known to those skilled in the art. In this disclosure negative saturation of the magnetic cores is to be interpreted as a zero binary signal.

Four feedback shift registers 11, 27, 28 and 29 having 11, 13, 17 and 19 stages, respectively, the numbers 11, 13, 17 and 19 being different co-prime numbers, are employed to produce signals having recurrance durations of $2^{N}-1$ bits; where N is the number of stages in each register. Preloading of cores 311, 321, 331, 341, 351 and selectively of core 911 as well as certain selected stages in each shift register 11, 27, 28 and 29 is achieved when spring bias switch 23 is released from terminal 24 and is swept past loading terminal 26 to operating terminal 31. This causes the magnetic cores selected by the load selector switches 32, 33, 34 and 35, associated respectively with shift registers 11, 27, 28 and 29, to change state from "zero" to "one", thereby preloading certain binary information therein. The number of load selector switches utilized depends upon the number of stages in each of the shift registers, i.e. shift register 11 having nine magnetic cores requires nine different switches, while shift registers 27, 28 and 29 having 11, 15 and 17 cores, respectively, require load selector switches having capacities equal to the number of stages contained therein. While load selector switches 32 have been shown as being of the toggle switch variety, it is to be understood that it may be more desirable to employ multi-position rotary switches for ease of operation and for compactness of size. By actuating any desired load switches it is to be understood that the number of preloaded stages in any of the respective shift registers may be varied in accordance with any particular binary coded information.

After switch 23 returns to its normal position wherein switch 23 alights on terminal 30, timing pulse amplifier 387 is coupled into the circuit and simultaneously supplies timing pulses to each of the magnetic cores employed in the complete circuit. It is to be understood that suitable amplifiers may be needed to drive strings of six or eight of the magnetic stages in series at one time. The type and number of amplifiers utilized is within the skill of the art and may be determined by ordinary design techniques.

As timing pulses are supplied to each shift register stage, the binary signal stored therein is transferred from one core to the next core. Thus, if it is assumed that cores 12, 13 and 14 store the quantities "one", "zero", "one", respectively, prior to the occurrence of a drive pulse, these cores will shift their pulses to the next cores so that cores 13, 14 and 15 will be stored with the values one, zero, and one, subsequent to the next clock pulse. Selected stages of each shift register 11, 27, 28 or 29 are connected to a respective feed back mixer circuit 36, 37, 38 or 39. Two or four register stages are connected to the feed back mixer logical circuit, depending upon the desired capacity of the machine. In order to effectively utilize each stage of all of the shift registers, it is necessary to connect the last stage of each shift register to the feedback mixer circuit to which it is associated. Connections between the shift register and the feed back mixers may be accomplished by conventional removable plug board connectors. These interconnections may be periodically changed so as to change the preprogramed output signal of the unit.

The logical circuitry associated with each of the feed back mixers is such that a binary output signal having a particular polarity, e.g., "one", will be produced when all but one of the input signals to the feed back mixer circuit are the same. In other words, if all of the signals supplied to mixer 36 are of the same state, either "zero" or "one", a "zero" output pulse will be obtained from that feed back mixer. Likewise if a pair of signals supplied to mixer 36 are identical and another pair are oppositely identical, a "zero" signal will be obtained from mixer 36. With four signals supplied to mixer 36, a "one" signal will be obtained at its output terminal only when three of the signals applied thereto are identical and the other signal is of opposite polarity. If "one" signals coupled to plug board terminals 41, 42, 43 and 44 are indicated by X, Y, Z and N, respectively, and "zero" signals applied to these terminals are respectively indicated as $\overline{X}, \overline{Y}, \overline{Z}$ and $\overline{N}$, ($\overline{X}$ is usually read "not X" or the complement of X), the Boolean function obtained from feedback mixer 36 on lead 45 may be given by the function $\overline{N}XYZ + N\overline{X}YZ + NX\overline{Y}Z + NX\overline{Y}\overline{Z} + \overline{N}XY\overline{Z} + \overline{N}X\overline{Y}Z + NX\overline{Y}\overline{Z} + NXY\overline{Z}$. The truth table #2 for the signal appearing on lead 45 is given in the table appearing at the end of the specification when four input signals are fed to the feed back mixers. If only two leads are connected between shift register 11 and feed back mixer 36 so that two input signals, N and X, are supplied thereto, the Boolean function of the signal appearing on lead 45 is $\overline{N}X + N\overline{X}$. Truth table #3 for two input signals applied to feed back mixer 36 appears at the end of the specification.

The actual construction of each feed back mixer 36–39 is identical and it is deemed necessary to describe only one of these circuits. Feed back mixer 36 comprises six magnetic cores 47, 49, 56, 57, 58 and 59 of the type previously described. In the particular disclosed embodiment, plugboard terminals 41, 42 and 43 are respectively connected to the output windings of magnetic cores 12, 15 and 17 of shift register 11. It is to be understood, however, that terminals 41, 42 and 43 may be connected to any of the stages in shift register 11 and that the particular arrangement shown is for purposes of illustration only. The signal appearing at terminal 41 is simultaneously applied to the input winding 46 of core 47 and to the inhibit winding 48 of core 49. Similarly, the signal appearing at terminal 42 is simultaneously applied to inhibit winding 51 of core 47 and to input winding 52 or core 49. The output windings 53 and 54 of cores 47 and 49, respectively, are coupled to terminal 55 by means of isolating rectifiers connected to each of the output windings. The connection of windings 53 and 54 to terminal 55 serves as an "or" gate.

For purposes of explanation, a pair of examples will be given to illustrate the manner in which the logical elements employed in this circuit function. It will be assumed that core 12 is storing a "one" and that core 15 is storing a "zero" at the time a timing pulse is produced by amplifier 245. At such a time, a positive pulse is supplied to inut winding 46 of core 47 by means of terminal 41 while no pulse is applied to inhibit winding 51 from terminal 42. The application of these pulses to core 47 causes it to switch to a positive state of magnetization and (at the next timing pulse) produce a positive voltage at output winding 53 that is supplied to terminal 55. In core 49, the application of a positive pulse to winding 48 inhibits the core from changing its state and no pulse is subsequently produced at its output winding 54. Thus, if core 12 is storing a "one" and core 15 is storing a "zero", a "one" output will appear at terminal 55 when the next timing pulse is generated and a "one" will also be produced if the state of cores 12 and 15 are reversed due to the symmetry of the logical circuitry associated with cores 47 and 49. If both cores 12 and 15 are "the ¢zero" state when a timing pulse is applied thereto a "zero" will appear at terminal 55. This may be explained as follows: when timing pulses are applied to cores 12 and 15 no output signals will be derived therefrom and cores 47 and 49 will remain at rest. If both cores 12 and 15 have "ones" stored therein at the time a timing pulse is applied thereto, a "zero" will also be fed to terminal 55 because these pulses will inhibit the loading of both cores 47 and 49 preventing any positive output signals to be generated thereby. The circuit comprising cores 47 and 49 is commonly referred to as a binary half adder.

The output signal from the stage associated with core 17 of shift register 11 is simultaneously applied to the input winding of core 56 and the inhibit winding of core 57. The input winding of core 57 and the inhibit winding of core 56 are simultaneously supplied with pulses indicative of the state of the last stage 20 of shift register 11 by lead 44. The output windings of half adder cores 56 and 57 are combined together to form an "or" circuit at terminal 61.

Half adder cores 58 and 59 have applied thereto the combined signals from the other cores 47, 49, 56 and 57 of feed back mixer circuit 36. The signal appearing at terminal 55 indicative of the Boolean function $X\overline{Y}+\overline{X}Y$ is applied to the input winding of core 58 and the inhibit winding of core 59. In a similar fashion the signal appearing at terminal 62 indicative of the Boolean function $N\overline{Z}+\overline{N}Z$ is supplied to the inhibit winding of core 58 and the input winding of core 59. The output winding of core 59 is coupled through an isolating rectifier and lead 45 to the first core 12 associated with shift register 11. In this manner four output signals from shift register 11 are combined in feed back mixer 36 to provide a single input for the stage of the shift register associated with core 12.

Recirculation of the information contained in shift register 11 is thus established providing a feed back shift register that enables the repetition or recurrence rate of the signals stored in shift register 11 to be $2^N-1$ bits, where N is the total number of stages employed in the shift register. In this particular shift register, having nine cores, there are actually 11 stages because feed back mixer 36 inserts a two bit delay in the signals applied thereto. Thus, for the first two timing pulses generated by amplifier 245 no input signal is fed to the input winding of core 12 from feedback mixer 36 because of the inherent delay associated with the cores in transferring information into and out of them, unless the cores of mixer 36 are also initially loaded through selector switches (not shown) in a manner similar to that disclosed in connection with register 11.

The feed back mixer circuitry associated with each of the other shift registers 27, 28 and 29 is identical to that employed for shift register 11. However, it may be desirable to utilize only two input signals to some of these feed back mixers rather than all four, depending on the desired capacity of the machine. Shift registers 27, 28 and 29, respectively, contain 11, 15 and 17 magnetic cores therein and may be considered as 13, 17 and 19 state shift registers, respectively, because of the feed back mixers associated therewith.

Output signals from the last stage of each shift register 11, 27, 28 and 29 are combined in another logical Boolean algebra circuit, output mixer 65 containing cores 66, 67, 68, 69 and 72. Output signals from the penultimate stages of shift registers 11 and 28, e.g. core 19 of register 11, are respectively connected to the inhibit windings of cores 66 and 67. Core 70, commonly referred to as a "ones generator" supplies the input windings of cores 66 and 67 with power pulses each time a timing pulse is produced by amplifier 245. In this manner, both cores 66 and 67 serve as inverting circuits for the next to the last stages of shift registers 11 and 28, respectively. Thus, if a "zero" is stored in core 19 at the time a timing pulse is produced core 66 will not inhibit the passage of a pulse from "ones generator" 70 through core 66. If, however, a "one" is stored in core 19, a "zero" will be produced at the output winding of core 66 because the signal applied to its inhibit winding blocks its loading and the generation of a subsequent output signal. Core 67 similarly responds to the next to the last stage of shift register 28. The inhibit winding of core 68 is supplied with the output signal of core 66 while the input winding of core 68 is fed with a signal indicative of the state of the last stage of shift register 27. In this manner, a signal is obtained at the output winding of core 68 indicative of the Boolean function AB; where A is the state of the last stage 20 of shift register 11 and B is the state of the last stage of shift register 27 at the time as when signal A is produced. It should thus be apparent that the signal from the next to the last stage of shift register 11 is supplied to core 66 rather than that from the last stage because of the inherent one bit delay produced by the core. Stated differently, when core 68 is receiving a signal on its inhibit and input windings these signals are indicative of the state of the last stages of both shift registers 11 and 27 at the same time.

In a similar manner, cores 67 and 69 are respectively supplied with input signals from the penultimate stage of shift register 28 and the last stage of shift register 29; the inhibit winding of core 69 being supplied with the output signal from core 67 and the input winding of core 69 being coupled to the last stage of shift register 29. Thus, the signal supplied to terminal 71 from output winding 69 is indicative of the Boolean function CD where C and D are the signals stored in the last stage of shift registers 28 and 29 at the same time.

Core 72 serves as a complimentary generator and produces an output pulse having "one" polarity that is coupled to output terminal 73 only when the last stage of each shift register 11, 27, 28 and 29 is in a "zero" state. This is accomplished by connecting the input winding of core 72 to the output winding of core 70 and by connecting the inhibit winding of core 72 to the last stage of each shift register by means of isolating diodes. Thus, if the last stage of any of the shift registers is in the "one" state, a pulse will be supplied to the inhibit winding and no output will be fed to terminal 73 from core 72. In Boolean terms, core 72 produces an output signal in accordance with the function $\overline{A+B+C+D}$, where A, B, C and D are as previously defined.

It is thus seen that output mixer 65 produces a Boolean Boolean at terminal 73 that will assumes a "one" state when all of the input signals applied thereto are either similar, i.e. all or none are zeros, or will produce a "one" output signal when certain pairs of the input signals applied to the mixer circuit are in the "one" state. The signal at terminal 73 will be in the "zero" state, in response to one half of the combinations of signals fed thereto and it will be in the opposite "one" state in response to the other half of the combinations of signals fed to it. Specifically, the output signal at terminal 73 will be in accordance with the Boolan function $AB+CD+\overline{A+B+C+D}$. The truth table #4 for this function appears at the end of the specification. The signal at terminal 73 will not repeat its cycle for $10^{18}$ bits generated by amplifier 245 and will have zero information biasing for the complete cycle. In utilizing a keying rate of approximately 100 words per minute no recurrence of signals produced at terminal 73 should occur for $10^9$ years, i.e. one thousand million years.

FIG. 6 is a schematic diagram of the comparator 117 or 127, which is a safety device that can be applied to this or other forms of binary scramblers. Cores 441 and 442 are delay stages for the clear text input signal to synchronize the clear and cipher text signals applied to the half-adder mixer circuit comprising cores 443 and 444. The clear text signal is applied to the input and inhibit windings of cores 443 and 444, respectively from terminal 824 via lead 137 or 138 and cores 441 and 442. The line or cipher text signal from mixer 116 or 126 is coupled via lead 139 or 140 to variable register 448, the inhibit winding of core 443 and the input winding of core 444. Variable resistor 448 permits balancing the two currents so that half-adder containing core 443 and 444 will function reliably. The current read-out terminals of these cores are coupled through isolating diodes to the inhibit winding of complement generator core 446 and the input winding of delay core 447. The series connected timing windings of cores 441–447 are supplied with timing pulses from timing pulse terminal 399, to provide energization of the buffer and mixer cores.

Core 445 is a conventional "ones" generator and supplies current to the input winding of core 446 through an isolating diode upon each occurrence of a timing pulse. The current read-out terminals of cores 446 and 447 are grounded through external resistors to give proper impedance to the "current" circuits.

Core 446, having its inhibit winding connected to the half adder output terminal inverts the half adder output signal and core 447 having its input winding in series with the inhibit winding of core 446 inserts the same delay introduced by core 446. Thus, the output voltages of cores 446 and 447 occur simultaneously and are complementary. The output signal of core 446 is supplied simultaneously to the shift windings of the cores in quatinary counter 410 through amplifier 417. Successive pulses from core 446 indicative of successive similarities between the pulses at terminals 497 and 498, shifts the signal stored in the cores of counter 410 from one core to another. After four successive similarities in the signals at terminals 498 and 497, an output pulse is generated by core 414. This output pulse reloads core 411, since it is fed back to its input winding, and shifts the signal stored in counter 420 from one stage to the next.

Similarly, when four successive pulses are supplied to amplifier 427, due to sixteen successive similarities at terminals 497 and 498, an output pulse is obtained from core 424. This pulse is supplied back to the input winding of core 421 and to the drive windings of the cores in quatinary counter 430 through amplifier 437.

Four consecutive output pulses from core 424, i.e. 64 successive similarities at terminals 497 and 498 causes an output pulse to be generated by core 434 of counter 430. This pulse is supplied back to the input winding of core 431, thereby reloading the core, and to the S input terminal of flip-flop 470. Flip-flop 470 is accordingly switched to actuate visual and aural alarms 480 and to turn-on keyer 118 or 128. Thereby a steady marking signal is supplied to the transmit channel 4 or to the receive terminal equipment 3. Malfunction is highly improbable because the chances of sixty four consecutive "zeros" from the key generator is extremely remote (1 in $10^{13}$ words).

Every time that the signals at terminals 497 and 498 are different, prior to the occurrence of sixty three consecutive similarities thereof, a trigger pulse is supplied from the voltage output terminal of core 447 to one-shots 450 and 460. "Clear" one-shot 450 generates a 20 microsecond output pulse which is coupled to the driving circuits of the 3 quarternary counters 410, 420, and 430, thus clearing the cores of their previous loads. "Load" one-shot 460 is coupled to the inhibit windings of cores 411, 421 and 431 in series fashion but in reverse polarity; its 40 microsecond output pulse persists beyond the clearing pulse and thus reloads the first stage of each of the 3 quarternary counters 410, 420 and 430.

Initial erasing and loading of the cores is accomplished by the connection of clear terminal 24, FIG. 4, through terminal 464 to the drive windings of the cores in counters 410, 420 and 430 and the connection from load terminal 26 to the inhibit windings of cores 411, 421, and 431. The pulses from terminals 464 and 466 actuate the cores in substantially the same manner as those produced by one-shots 450 and 460.

With this comparator, there is a possibility of false alarm because sixty three similar consecutive pulses at terminals 498 and 497 results in core 434 being loaded. If there is a difference between the next two pulses, and output pulse is obtained from core 434 because of the signal applied to the drive winding thereof from pulse shaper 450. The possibility of this occurring is extremely remote, 1 in $2^{48}$ bauds or 1 in $10^{13}$ words.

The comparator is preferably constructed in the form of a plug-in module or modules. Normally 1 comparator per scrambler should be supplied, and it should be inserted in the Transmit Chassis 110. For twin-transmit operation of the scrambler two comparators should be supplied, but the extra comparator can be taken from the associated twin-receive scrambler at the other end of the circuit. In case of need a transmit chassis can operate without the comparator, as a calculated risk, and still present no more hazard of transmitting inadvertent clear text than is found in presently available cryptographic equipments.

FIG. 8 is a schematic diagram of the ciphering mixer 116 or 126, which comprises a 6-core magnetic unit 810, two transistor emitter-followers 817 and 818 and a transistor flip-flop 820. The mixer combines the key generator signal with the unciphered signal of the local transmitter in a binary half adder to produce the ciphered mark and space transmitted signals or it combines the received cipher signal with the key generator signal to produce the unciphered mark and space signals fed to the local receiving system. The former function is accomplished by mixer 116 and the latter by mixer 126.

The mixer intelligence input signal on lead 133 or 134 is supplied via terminal 822 and current limiting resistor 809 to the input winding of sampling 801 which supplies current pulses of the correct shape and synchronism to the input winding of core 802 and inhibit winding of core 803. The intelligence signal output voltage of core 801 is also applied through emitter follower 817 to comparator 117 or 127 via terminal 824; emitter follower stage 817 being employed to prevent loading of the output winding of core 801 by the comparator. The sampling-gate 801 is a conventional 4-winding, one-core-per-bit magnetic shift-register unit identical with other 4-winding cores employed in this equipment. The inhibit winding of core 801 is permanently biased to negative magnetic saturation from the positive regulated voltage bus, with the inhibiting current limited and controlled by variable resistor 812. Resistor 812 is adjusted so the core 801 will switch slowly from positive to negative saturation and slowly back to positive saturation again, following the "loop" or "line" signals at terminal 822, without generating appreciable voltage in its output winding. The "shift" or "drive" winding of core 801 is connected in a series-string with the drive windings of cores 802, 803, 804, 805 and 806, and all cores are driven from a single driving-amplifier 811, drive current being limited by resistor 819. Timing pulses are fed to the drive windings through terminal 821 from timing unit 112 or 122 at the middle of each baud or bit of the input signal at terminal 822. The driving pulses sense and read-out the signals stored in sampling gate 801 so sharp pulses indicative of core state are obtained when they are applied. The current output terminal of sampling gate 801 is coupled to the input winding of core 802 and inhibit winding of core 803 which comprise the binary half-adder that combines the intelligence and key generator signals. The voltage output terminal of sampling gate 801 is coupled to comparator input terminal 497 via emitter-follower 819 and terminal 824, thereby supplying the clear-text signal input to the comparator 117 or 127.

The key generator signal is applied to the series connected inhibit and input windings of cores 802 and 803 respectively, while the output intelligence current signal from core 801 is applied to the series connected input and inhibit windings of cores 802 and 803, respectively. The current readouts from cores 802 and 803 are fed through blocking diodes 807 and 808. respectively, combined to generate the mixer half adder output signal and supplied to the series connected inhibit and input windings of inverting core 805 and delay core 806, respectively. The input winding of inverting core 805 is supplied with a current pulse by ones generator 804 upon the occurrence of each timing pulse. Since the half adder output current is applied to the inhibit winding and the ones generator output current is applied to the input winding of core 805, the voltage output of core 805 is the complement of the mixer output signal. The output voltages of cores 805 and 806 are applied to the reset and set terminals, respectively, of flip-flop 820, core 806 being employed to provide synchronization for the out of phase signals applied to the flip-flop. Resistors 815 and 816 connected in the output circuits of cores 804 and 805, respectively, are employed to provide proper loading of the core output current.

The transistor flip-flop 820 is of conventional set/reset design. Terminals "A" and "B" are the output terminals, one of which is ON (conducting) and the other OFF (cut-off or non-conducting), but the "A" terminal is the only output terminal that is used. Terminals "R" and "S" are the input terminals, one of which is energized by a positive pulse when required. An input pulse to the "R" terminal causes the "A" output terminal to be cut-off and the "B" output terminal to conduct while the converse is true for an input pulse to the "S" terminal. The flip-flops are designed to respond to positive control pulses only, but if desired the elements may be responsive to negative pulses, in which case other pulse polarities must be reversed for compatibility and proper operation. As previously explained, the "S" input terminal is coupled to the voltage output terminal of delay core 806, producing a voltage and current at output terminal 825 when a "ONE" has been read out of core 806. The "R" input terminal is coupled to the voltage output terminal of complement generator 805, producing no voltage and no-current at output terminal 825 when a "ONE" has been read out of core 805. The mark and space rectangular pulses generated by flip-flop 820 normally supply just enough current to control the electronickeyer 118 or 119.

Clock (102)

FIG. 7 is a block diagram of the clock 102 of FIG. 2. The clock is divided into 5 functional parts, preferably in the form of plug-in modules, as follows:

| | |
|---|---|
| Basic frequency converter | 701 |
| NTDS frequency converter | 702 |
| SAGE/Rixon frequency converter | 703 |
| Pulse shaping network connected to timing and phasing unit 112 in transmitter chassis 110, | 704 |
| Pulse shaping network connected to timing and phasing unit 122 in receiver chassis 120. | 705 |

The normal functions of the scrambler can be performed without using the 702 and 703 modules and the description will be given accordingly.

A 1 megacycle sine wave is received from stable oscillator 101 through lead 130 (FIG. 2) and input terminal 706, and is coupled via patch cord 707 and jack 708 to a decade boot-strap frequency divider consisting of divide-by-10 stage 710, multiply-by-3 stage 711 and multiply-by-3 stage 712. Sine wave outputs of 100 kc, 300 kc and 900 kc are generated by the respective stages. The 300 kc output from stage 711 is coupled to a second decade boot-strap consisting of divide-by-10 stage 713 and multiply-b-9 stage 714, which generate sine wave outputs of 30 kc and 270 kc respectively. The 270 kc and 30 kc outputs are coupled to a heterodyne mixer 715 which generates the difference-frequency of 240 kc. This output frequency is coupled to a quintile boot-strap consisting of a divide-by-5 stage 716 and a multiply-by-4 stage 717, which generate output frequencies of 48 kc and 192 kc respectively. The 48 kc output is connected to terminal 733, which is preferably a double-jack. The 48 kc clock-rate is the basis of the timing pulses for Department of Defense Digital Data Systems (4800, 2400, 1200 and 600 bits/second) and for 1000 bauds per second facsimile.

The 270 kc output from stage 714 is also coupled to another boot-strap consisting of divide-by-23 stage 718, multiply-by-4 stage 719, and multiply-by-6 stage 720. The 46-22/23 kc output from stage 719 is connected to double-jack 731 and is the timing basis for 100 wpm operation of Teletype multiplex equipments.

The 270 kc output from stage 714 is also connected to jack 721 and may be coupled (as shown) via patch cord 724 to a quintile boot-strap consisting of divide-by-5 stage 725 and multiply-by-4 stage 726. With 270 kc input, the output frequency from stage 725 is 54 kc. The output of stage 725 is connected to double-jack 732 nd is thence coupled via patch cords 736 and 737 to the two conventional pulse shaping networks 704 and 705 which generate clock pulses of required shape, amplitude and duration, at exactly the same rate as the sine wave timing signal applied thereto. Clock pulses generated within network 704 are conducted via output terminal 738 and lead 131 (FIG. 2) to transmit timing and phasing unit 112. In like manner 705 clock pulses are conducted via terminal 739 and lead 132 (FIG. 2) to receive unit 122. The 54 kc clock pulses are the timing basis for 60 wpm and 75 wpm operation of Teletype multiplexes, and may be used for other purposes. Output clock pulses to the 112 and 122 units are normally at the same rate, but do not have to be if it is desired to transmit and receive signals of different frequencies simultaneously.

For use with the Navy Tactical Data System, the NTDS module 702 (upper right hand portion of FIG. 7) must be added to the clock 102. 270 kc output from stage 714 and 100 kc output from stage 710 are combined in heterodyne mixer 740, and the output sum-frequency of 370 kc coupled to heterodyne mixers 741 and 750. The 900 kc output of stage 712 is also coupled to mixer 741 and the difference-frequency of 530 kc is coupled to vigintile boot-strap consisting of divide-by-20 stage 742, multiply-by-3 stage 743 and multiply-by-7 stage 744. The 556.5 kc output from stage 744 is coupled to a quintile boot-strap consisting of divide-by-5 stage 745 and multiply-by-4 stage 746. The 445.2 kc output from stage 746 is coupled to a decade boot-strap consisting of divide-by-10 stage 747 and multiply-by-9 stage 748. The 44.52 kc output from stage 747 is connected to jack 735, and is the timing basis for the 2226 bps which is one of the two simultaneous bit rates required by the NTDS. For NTDS operation, network 705 is unplugged from terminal 732 and patched to terminal 735, but network 704 is connected to terminal 732 and the scrambler operated in twin-transmit or twin-receive mode.

The 30 kc output from stage 713 is coupled to heterodyne mixer 750 to which the 370 kc output of mixer 740 is also coupled. The difference-frequency of 340 kc is coupled to a quintile boot-strap consisting of divide-by-5 stage 751 and multiply-by-4 stage 752. The 272 kc output from stage 752 is connected to jack 722 and thence coupled via patch cord 724 to the quintile boot-strap 725/726 previously described. The 272 kc input is reduced to a 54.4 kc output (from stage 725) which is coupled to network 704 via patch cord 736. This 54.4 kc is the timing basis for 1360 bps, which is the other of the two simultaneous bit rates required by the NTDS.

For use with either the SAGE system or Rixon multiplex equipments, the SAGE/Rixon module, 703 (lower right hand portion of FIG. 7) must be added to the clock 102, and the NTDS module 702 may be removed. The 1 mc stable input signal is directly coupled from the input terminal 705 to a heterodyne mixer 760 and to a duodecimal boot-strap consisting of divide-by-12 stage 761 nd multiply-by-11 stage 762. The 916-$\frac{2}{3}$ kc output from stage 762 is coupled to a decade boot-strap consisting of a divide-by-10 stage 765, multiply-by-3 stage 766 and multiply-by-3 stage 767. The 275 kc output from stage 766 is connected to jack 723 and is thence coupled via patch cord 724 to the previously described decade boot-strap 725/726. The output clock rate of 275/5 or 55 kc is the timing basis for the 1100 bps required by SAGE.

The 192 kc output from stage 717 is coupled to a frequency-doubler 769 whose output is coupled to a heterodyne mixer 770. The 240 kc output from stage 715 is also coupled to heterodyne mixer 770. The output sum-frequency of 624 kc from mixer 770 is connected to a duodecimal boot-strap 771/722. The output frequency of 624/12 or 52 kc from stage 771 is connected to jack 734 and thence coupled, via patch cord 336 or 337, to network 704 or 705. This 52 kc clock rate is the timing basis for the 1300 bps required by SAGE.

The 750 bps bit rate required by SAGE can be derived from the 54 kc clock rate and is the same bit rate that is required for 16-channel Teletype multiplex operating at 75 wpm. It can also be derived from the previously mentioned 48 kc clock rate.

For the Rixon multiplex, the 83-$\frac{1}{3}$ kc output from stage 761 is coupled to an octal boot-strap 763/764. The 10-5/12 kc output from stage 763 is coupled to the previously mentioned heterodyne mixer 760 to which the 1 mc input signal frequency is coupled. A sharply tuned high-pass or band-pass filter accepts the sum-frequency of 97/96 mc or 1.010,416-$\frac{2}{3}$ mc and rejects the 1 mc "carrier" and the difference-frequency of 95/96 mc. The output of mixer 760 is connected to jack 709 and thence after suitable replugging of patch cord 707, to decade boot-strap 710/711/712. From here on the operation is exactly as described for the basic module 701, except all the frequencies are raised by exactly 1 part in 96. The 45-22/23 kc output at jack 731 becomes 47-41/92 kc and the 54 kc output at jack 732 becomes 54-9/16 kc.

To summarize, the clock 102 described herein generates clock pulses at the following 9 required rates:

Table 6

| Clock-Rate | System | Remarks |
|---|---|---|
| 44.52 KC | NTDS | 2226 bps (bauds per sec.) |
| 46–22/23 KC | Teletype multiplex | 100 wpm |
| 47–41/92 KC | Rixon multiplex | 100 wpm |
| 48 KC | Dept. of Defense Digital Data System | 600, 1200, 2400, 4800 1000 bps. |
| | SAGE and Facsimile | 750 bps. |
| 52 KC | SAGE | 1300 bps |
| 54 KC | Teletype multiplex | 60 and 75 wpm |
| 54.4 KC | NTDS | 1360 bps |
| 54-9/16 KC | Rixon multiplex | 60 and 75 wpm |
| 55 KC | SAGE | 1100 bps |

It is possible, of course, by the components and patch cords herein provided, to generate other clock-rates that are not presently required nor desired, but which may be utilized in the future. It is also possible by means of the techniques disclosed herein to add other components which will generate new clock-rates, not presently required, from a standard 1 mc stable oscillator.

To be compatible with the automatic phase-correcting unit 300 disclosed in connection with FIG. 3, the average clock-rate is about 10×4800 bits/second or about 50 kc and the range of clock-rates should not exceed about ±10%. These requirements have been met in this invention.

The oscillator 101 that actuates clock 102 is a standard off-the-shelf 1 megacycle stable oscillator, preferably fully-transistorized in the interests of compactness and compatibility with the other components of the scrambler. One megacycle is selected since it corresponds with the frequency standard by the National Bureau of Standards so that calibration is easily performed. Oscillator 101 should be of $10^{-6}$ stability in order not to degrade the over all stability of the systems with which used. Because the transmitting scrambler "tracks" the transmitting MUX, no useful purpose is served by having stability of the scrambler oscillator better than the multiplexer oscillator.

When the synchronous circuit is subjected to severe jamming or bad multipath "jitter" it is often desirable to disable the receiving phase-corrector 300 and "ride" on the receiving oscillator. In such cases the stability of the receiving scrambler oscillator should be equal to the stability of the transmitting MUX oscillator. In the case of systems like the Rixon multiplexer which have oscillators one or two magnitudes of stability better than the oscillator built into the scrambler, it may be desirable to use a 1 mc externl oscillator of superior stability.

FIG. 9 is a schematic diagram of the starting unit 103 of FIG. 2. In order to follow the operation of the starting unit the rest of the system must be understood: hence its deferment until the last. The starting unit comprises sync pattern generator containing cores 901 and 902, start pattern generator containing cores 903–906, start signal sensing unit including cores 911–916 and control switches 931–939 or 930.

The 12 cores 901–906 and 911–916 are driven as 2 parallel strings of 6 cores each by the timing pulses applied to terminal 941 from timing and phasing unit 112. The drivers 909 and 919 for the core timing windings are coupled to the pole of 3-position switch 939. For transmitting, the XMT contact of switch 939 is connected via terminal 941 and lead 135 to the timing output terminal 399 of the timing and phasing unit 112 in the transmit chassis 110. During operation of the apparatus, after starting and synchronizing is accomplished, switch 939 is set at the center or off position to cut-out starting unit 103. Terminal 941 is also connected to switch 937 and thence via terminal 943 and lead 135 to supply the clear text input signal to the XMT ciphering mixer 116 and comparator 117. At starting only, switch 937 is opened thus disabling comparator 117 and all elements of the ciphering mixer 116 except flip-flop 820. During the start process, flip-flop 820 is energized by the start pattern signals applied to it from cores 903 and 905 via terminals 923 and 924, and switches 931 and 932. The current start pattern signal generated by cores 903–906 is supplied from the output winding of core 906 to the input winding of start pattern signal sensor core 911 via armature 951 of switch 932. Terminals 925 and 926, responsive to the output signals of mixers 116 and 126, respectively, are connected to switches 934 and 935, are set to the grounded contacts during starting to effect mixer loading. Switch 936 is set to the XMT contact, so that the voltage output terminal of core 916 is coupled to the input terminal of the "transit" electronic switch 113 via terminal 927 and lead 151 to close the switch when the start signal is generated by cores 903–906 and sensed by cores 911–916.

After the Receiving Station reports ready or is presumed ready by passage of sufficient time interval, power is turned on the equipment and three-pole, three-position switch 932 is moved from its center or off position where the armatures alight on terminals 952, 953 and 954 to the "Sync" contacts where the armatures alight on terminals 954, 955 and 956, thus coupling the input R and S terminals of flip-flop 820 to the voltage readout terminals of magnetic flip-flop cores 901 and 902 respectively, and grounding the current readout terminal of core 906 to prevent saturation. The output winding of core 901 is coupled to the input winding of core 902 and the output winding of core 902 is coupled back to the input winding of core 901, thus switching a preloaded "ONE" from one core to the other. The effect is to transmit a Space-Mark-Space-Mark-Space-Mark-pattern through the transmit channel 4 in response to timing signals from timing and phasing unit 112.

For receiving, the armature of 3-position switch 939 is set to the RCV contact, coupling the timing circuit of the starting unit 103 to the output (timing) terminal 399 of the timing and phasing unit 122 in the receive chassis 120, via terminal 942 and lead 136. Terminal 942 is also connected to switch 938, left in its closed condition to couple the timing pulses to the RCV ciphering mixer 126. Three-pole three position switch 932 is set to its center or off position, where the armatures engage terminals 952, 953 and 954 thus de-coupling the voltage outputs of cores 901, 902, 903 and 905 from the flip-flops 820 in the ciphering mixers 116 and 126. Three-position switch 933 is set to its RCV contact; switch 934 is set to its grounded contact; switch 935 is set to its RCV contact; the foregoing couples the input winding of core 911, via terminal 926 and lead 144 to the current output terminal of core 806 of the receive ciphering mixer 126 so the remotely generated start pattern signal is applied to the local start sensing unit containing cores 911–916. Switch 936 is set to the RCV contact, coupling the voltage output terminal of core 916 indicative of reception of the start pattern signal via terminal 928 and lead 152, to the XMT electronic switch 123 of the receive chassis 120; switch 123 being activated to supply key generator 124 with timing pulses.

Operation of the transmitter and receiver is initiated by turning power on, resetting electronic switches 113 and 123 so key generators 114 and 124 are not supplied with timing pulses from timing and phasing units 112 and 122, opening manual switches 115 and 125 to prevent actuation of mixers 116 and 126 by key generators 114 and 124 so the transmitted and received signals pass through the mixers unaltered, setting up, clearing and loading of key generators 114 and 124 by switch 23, thus establishing the transmitting and receiving terminals ready for automatic synchronization and starting.

When the transmitting operator receives a go ahead signal over the other duplex channel, or is otherwise satisfied that the receiving unit is in proper synchronism, he actuates switch 932 so the armatures engage the start contacts 957, 958 and 959, thereby coupling core 903 voltage output via terminal 923 to the R input terminal of transmit flip-flop 820, core 905 voltage output via terminal 924 to the S input terminal of transmit flip-flop 820, and core 906 current output to the XMT contact of switch 933 and thence to the input winding of core 911.

Cores 903, 904 and 905 are connected as a 3-stage ring or recirculating-loop commutator, with core 906 operating simultaneously with 905 as a buffer stage. The preloaded "ONE" in core 903 is shifted to 904 with the first timing pulse, then is shifted to cores 905 and 906 with the second timing pulse, and back to core 903 with the third timing pulse, with operation repeated in response to additional timing pulses applied to cores 903–906. The successive current read-outs from core 906 in response to the timing signal into core 911 represent -ZERO-ZERO-ONE-ZERO-ZERO-ONE and repeat or SPACE-SPACE-MARK-SPACE-SPACE-MARK etc. The voltage read-outs from cores 903 and 905 into flip-flop 820, and the corresponding signals transmitted over the transmit channel 4 to the receiving scrambler represent -SPACE-SPACE-MARK-SPACE-SPACE-MARK, and repeat.

In the associated receiving unit 120, the above start-signal pattern is received, integrated and sampled in the receiving mixer 126, and passes through the mixer into the input winding of core 911 of the start-signal sensing unit 911–916 (inclusive) unaltered in polarity (because the key generator is disconnected by manual switch 125) but delayed by 2 binary digits to compensate for the 2 binary-digit delay of the subsequent enciphered signals within the transmitting mixer 116. There is no delay in the transmitting unit, the start signal pattern going directly from the current read out terminal of core 906 via switch 933 to the input winding of core 911.

The start-signal sensing unit (cores 911–916) is so connected that a voltage pulse is read out of core 916 (and into the electronic switch 113 or 123 to which it is coupled) only when it senses the 5-bit signal ZERO-ZERO-ONE-ZERO-ZERO or SPACE-SPACE-MARK-SPACE-SPACE. In this way, the synchronizing signal (MARK-SPACE-MARK-SPACE-MARK-SPACE) cannot be mistaken for the start signal unless there are garbles in 2 or 3 of five consecutive bits of the signal. The current output circuits of cores 911, 912, 914 and 915, after passing through the input winding of the following stage or a compensating resistor are coupled, via isolating diodes, to the inhibit winding of core 916. The current output circuit of core 913, is supplied in series to the input winding of core 914, a compensating diode and to the input winding of core 916. A ONE (or MARK) in the 1st, 2nd, 4th, or 5th bits of the input signal will inhibit the loading of core 916. A ZERO (or SPACE) in the 3rd bit of the input signal will give a ZERO read out from core 913 and therefore fail to load core 916. Of the 32 possible combinations of a 5-bit binary signal only one (SPACE-SPACE-MARK-SPACE-SPACE), the prescribed start-signal, will be accepted by the start signal sensing unit 911–916 and thus trigger the associated electronic switch 113 or 123.

For operational simplicity and "fool-proofness" the 9 control switches 931–939 are incorporated in a single multi-position, multi-pole, rotary selector switch (930), but the elements are more easily described and clearly illustrated as separate components. By appropriate switch settings the (normal) transmit chassis 110 can be used for receiving the synchronizing and starting signals, and the (normal) receive chassis 120 can be used for transmitting them, thus providing for the twin-receive and twin-transmit modes of operation.

The transmit key-generator 114 is started at the very first "appearance" of the start signal, but the manual switch 115 is still open and the unenciphered start pattern is repeated so long as switch 932 is on the start contact. The receive key-generator 124 is normally started at the very first transmission of the start signal, but due to poor circuit conditions may not be sensed until the 2nd or possibly 3rd or 4th repetition. In case of delayed start, the manual corrector system described under FIG. 3, must be used. After momentarily resting on start contact, switch 932 is set to its "OFF" position, thereby decoupling both the sync pattern generator 901–902 and the start pattern generator 903–906. Switch 939 is also set to its OFF position, thereby disabling the start sensing unit as well as the two pattern generators. The manual switches 115 and 125 are now closed, thereby supplying the key signal of generators 114 and 124 to mixers 116 and 126, respectively. The remote and local system are now operating in synchronism and correct phase. The associated transmit and receive multiplexes (or other communications terminal equipments) can be connected and the system as a whole is in operation.

TRUTH TABLES

Table 2

| 4-Tap Feed-back Mixer | | | | | | | | | |
|---|---|---|---|---|---|---|---|---|---|
| N | X | Y | Z | Out | N | X | Y | Z | Out |
| 0 | 0 | 0 | 0 | 0 | 1 | 0 | 0 | 0 | 1 |
| 0 | 0 | 0 | 1 | 1 | 1 | 0 | 0 | 1 | 0 |
| 0 | 0 | 1 | 0 | 1 | 1 | 0 | 1 | 0 | 0 |
| 0 | 0 | 1 | 1 | 0 | 1 | 0 | 1 | 1 | 1 |
| 0 | 1 | 0 | 0 | 1 | 1 | 1 | 0 | 0 | 0 |
| 0 | 1 | 0 | 1 | 0 | 1 | 1 | 0 | 1 | 1 |
| 0 | 1 | 1 | 0 | 0 | 1 | 1 | 1 | 0 | 1 |
| 0 | 1 | 1 | 1 | 1 | 1 | 1 | 1 | 1 | 0 |

Table 3

| 2-Tap Feed-back Mixer | | |
|---|---|---|
| N | X | Out |
| 0 | 0 | 0 |
| 0 | 1 | 1 |
| 1 | 0 | 1 |
| 1 | 1 | 0 |

Table 4

| Output Mixer | | | | | | | | | |
|---|---|---|---|---|---|---|---|---|---|
| A | B | C | D | Out | A | B | C | D | Out |
| 0 | 0 | 0 | 0 | 1 | 1 | 0 | 0 | 0 | 0 |
| 0 | 0 | 0 | 1 | 0 | 1 | 0 | 0 | 1 | 0 |
| 0 | 0 | 1 | 0 | 0 | 1 | 0 | 1 | 0 | 0 |
| 0 | 0 | 1 | 1 | 1 | 1 | 0 | 1 | 1 | 1 |
| 0 | 1 | 0 | 0 | 0 | 1 | 1 | 0 | 0 | 1 |
| 0 | 1 | 0 | 1 | 0 | 1 | 1 | 0 | 1 | 1 |
| 0 | 1 | 1 | 0 | 0 | 1 | 1 | 1 | 0 | 1 |
| 0 | 1 | 1 | 1 | 1 | 1 | 1 | 1 | 1 | 1 |

Table 5

| Ciphering Mixer | | |
|---|---|---|
| Key | Text | Signal |
| 0 | 0 | 0 |
| 0 | 1 | 1 |
| 1 | 0 | 1 |
| 1 | 1 | 0 |

It should now be apparent that there has been herein disclosed a synchronous, universal, binary cryptographic system which may operate in conjunction with all presently available and projected military synchronous binary communications systems at all currently agreed-upon bit rates. Portability is achieved by use of magnetic core circuitry which results in light weight and rugged construction.

While I have described and illustrated one specific embodiment of my invention, it will be clear that variations of the details of construction which are specifically illustrated and described may be resorted to without departing from the true spirit and scope of the invention as defined in the appended claims.

I claim:

1. A synchronous binary cryptographic system responsive to an input synchronous telegraph signal comprising means for generating timing pulses of substantially fixed, predetermined frequency, means for generating a synchronous binary cryptographic key in synchronism with timing pulses applied thereto by said means for generating timing pulses, switch means actuated by a predetermined input signal sequence for applying the timing pulses to said means for generating the binary cryptographic key, said cryptographic key generating means being continuously responsive to said timing pulses during operation of the system and means for combining said input signal with the cryptographic key.

2. A synchronous binary cryptographic system responsive to an input synchronous telegraph signal comprising means for generating clock pulses of substantially fixed, predetermined frequency, means responsive to the clock pulses for generating timing pulses, means for adjusting the phase of the generated timing pulses in response to the phase difference between the timing pulses and an input binary signal, means for generating a synchronous binary cryptographic key when the timing pulses are applied thereto, said key being synchronous with said input telegraphy signal switch means actuated by one predetermined input signal sequence for applying the timing pulses to said means for generating the cryptographic key, said cryptographic key generating means being continuously responsive to said timing pulses during operation of the system and means for combining the binary signal with the binary cryptographic key, the phase of the timing pulses being adjusted so that the cryptographic key and said input signal are applied with substantially the same phase to said means for combining.

3. The system of claim 2 wherein said cryptographic key generating means includes a plurality of feedback shift register circuits having co-prime numbers of stages, each of said circuits including a logic circuit responsive to the outputs of at least two stages of the respective register, said circuit having an output supplied to the first stage of the respective register.

4. In a synchronous binary cryptographic transmitter responsive to an input synchronous telegraph signal, means for generating a synchronizing binary signal, means for generating a starting signal, means for generating timing pulses of substantially predetermined and fixed frequency, means for generating a synchronous binary cryptographic key when the timing pulses are applied thereto, said key being synchronous with said input telegraphy signal, switch means for selectively coupling the timing pulses to the means for generating the binary cryptographic key in response to the starting signal, said cryptographic key generating means being continuously responsive to said timing pulses during operation of the system, means for combining the cryptographic key with the input signal to produce a synchronous enciphered binary signal and means for transmitting the enciphered, starting, and synchronizing binary signals said enciphered signal being synchronous with said input signal.

5. The apparatus of claim 4 further comprising means for preventing transmission of the enciphered binary signal when the input binary signal and the enciphered binary signal are identical for a predetermined number of timing pulses.

6. The apparatus of claim 4 further comprising means for producing an alarm when the input binary signal, and the enciphered binary signal are identical for a predetermined number of timing pulses.

7. The apparatus of claim 4 further comprising a standard frequency oscillator, clock pulse generating means responsive to said oscillator for activating said timing pulse generating means, and means for varying the phase of the timing pulses applied to said binary cryptographic key generator means in response to the phase difference between the generated timing pulses and the input binary signal so that bits of the cryptographic key and the input telegraphy signal are applied in synchronism to said combining means.

8. The system of claim 4 wherein said cryptographic key generating means includes a plurality of feedback shift register circuits having co-prime numbers of stages, each of said circuits including a logic circuit responsive to the outputs of at least two stages of the respective register, said circuit having an output supplied to the first stage of the respective register.

9. In a synchronous binary cryptographic receiver responsive to an input enciphered, synchronous telegraphy signal, means for generating timing pulses of predetermined, fixed frequency, means for generating a synchronous binary cryptographic key in response to the timing pulses applied thereto by said means for generating, switch means for coupling the timing pulses to the means for generating the binary cryptographic key only after said input signal is of one predetermined sequence, said cryptographic key generating means being continuously responsive to said timing pulses during operation of the system and means for combining the received binary signal with the cryptographic key to produce a synchronous deciphered binary signal said key and input telegraphy signal being in synchronism so that bits of the key and the input telegraphy signal are applied in synchronism to said combining means and said deciphered signal is synchronous with said input signal.

10. The apparatus of claim 9 further comprising a standard frequency oscillator, clock pulse generating means responsive to said oscillator for activating said timing pulse generating means, and means for varying the phase of the timing pulses applied to said binary cryptographic key generator means in response to the phase difference between the generated timing pulses and the input binary signal so that bits of the cryptographic key and the input telegraphy signal are applied in synchronism to said combining means.

11. The apparatus of claim 10 further including manual means for varying the number of timing pulses generated.

12. The system of claim 9 wherein said cryptographic key generating means includes a plurality of feedback shift register circuits having co-prime numbers of stages, each of said circuits including a logic circuit responsive to the outputs of at least two stages of the respective register, said circuit having an output supplied to the first stage of the respective register.

13. A synchronous full duplex binary cryptographic apparatus comprising a source of constant frequency oscillations, a transmitting scrambler comprising means for generating first timing pulses in response to the constant frequency oscillations, a synchronous clear text binary signal source, means for generating a start signal of predetermined sequence, means for generating a synchronous first binary cryptographic key in response to the first timing pulses, first switch means responsive only to the start signal sequence for applying the first timing pulses to said first cryptographic key generator, said first cryptographic key generating means being continuously responsive to said timing pulse during operation of the system, first means for combining the first cryptographic key with the clear text signal to produce a synchronous enciphered binary signal, said enciphered and clear text signals being synchronous, means for transmitting the enciphered signal, said first cryptographic key being synchronous with said clear text source so that bits of said first key and said clear text are applied in synchronism to said first combining means, means for receiving another synchronous enciphered binary signal, means for generating second timing pulses in response to the constant frequency oscillations, means for generating a synchronous second binary cryptographic key in response to the second timing pulses, another switch means responsive only to a predetermined sequence of the received signal for applying the second timing pulses to said second cryptographic key generator means, said second cryptographic key generating means being continuously responsive to said timing pulses during operation of the system, and means for combining the received signal with the second cryptographic key to produce another synchronous clear-text binary signal, said another clear text and said received signals being synchronous, and said second cryptographic key being synchronous with said another enciphered signal so that bits of second key and said another enciphered signal are applied in synchronism to said second combining means.

14. The apparatus of claim 13 further including means responsive to said oscillations for generating clock pulses to activate said timing pulse generating means, wherein said means for generating the first timing pulses comprises means for adjusting the phase of the pulses applied to said means for generating the first binary cryptographic key in response to phase differences between the clear text and the timing pulses, said phase being adjusted so that the first named clear text and timing pulses are applied with like phases to said means for generating the first cryptographic key.

15. The apparatus of claim 13 wherein said means for generating the second timing pulses comprises means for varying the phase of the pulses applied to said means for generating the second binary cryptographic key in response to the phase differences between the received cipher signal and the timing pulses.

16. The apparatus of claim 13 wherein said means for generating the first timing pulses and said means for generating the second timing pulses each includes separate means for generating multifrequency timing pulses.

17. The system of claim 13 wherein each of said cryptographic key generating means includes a plurality of feedback shift register circuits having co-prime numbers of stages, each of said circuits including a logic circuit responsive to the outputs of at least two stages of the respective register, said circuit having an output supplied to the first stage of the respective register.

18. A synchronous binary cryptographic scrambler responsive to synchronous telegraphy signals and designed to operate with at least 30 different bit rate communication systems, comprising an oscillator of standard frequency, clock means triggered only by said oscillator for generating clock pulses of up to nine different anharmonically related clock pulse frequencies, means responsive to a selected clock pulse frequency for generating timing pulses having a repetition rate equal to the bit rate of the communication system coupled to the scrambler, means responsive to said timing pulses for generating a synchronous binary cryptographic key, and mixer means responsive to the cryptographic key and one of said telegraphy signals coupled to the scrambler for generating a further synchronous telegraphy signal, said cryptographic key generating means being continuously responsive to said timing pulses during operation of the system, said key and telegraphy signal being in synchronism as applied to said mixer means so that said telegraphy signals are synchronous with each other.

19. The scrambler of claim 18 wherein said standard frequency is selected from the frequencies transmitted by the Bureau of Standards for calibration purposes.

20. The scrambler of claim 18 further including means responsive to the phase difference between the one of said telegraphy signals coupled to the scrambler and the selected timing pulses so that said telegraphy signal and timing pulses are applied to said mixer means in phase for adjusting the phase of the timing pulses.

21. The scrambler of claim 18 further including means for generating a local starting signal in response to a predetermined starting pattern of the communication system signal applied to the scrambler, and means for coupling said timing pulses to said binary and cryptographic key generator means only after said local starting signal is applied thereto.

22. The scrambler of claim 18 wherein said timing pulse generating means and binary cryptographic key generating means include magnetic core elements.

23. The scrambler of claim 18 further including means for producing an alarm signal and preventing the transmission of said further signals when the communication system signal coupled to the scrambler and said further signal are identical for a predetermined number of timing pulses.

24. The scrambler of claim 18 further including means for producing an alarm when the communication system signal coupled to the scrambler and said further signal are identical for a predetermined number of timing pulses.

25. The scrambler of claim 18 further including means for preventing transmission of said further signals when the communication system signal coupled to the scrambler and said further signal are identical for a predetermined number of timing pulses.

26. The scrambler of claim 18 further including manual means for increasing and decreasing the number of timing pulses by a predetermined amount.

27. The scrambler of claim 18 further including means for generating alternate mark and space synchronizing signals in response to said timing pulses, each of said synchronizing signals being generated in response to each of said timing pulses.

28. The system of claim 18 wherein each of said cryptographic key generating means includes a plurality of feedback shift register circuits having co-prime numbers of stages, each of said circuits including a logic circuit responsive to the outputs of at least two stages of the respective register, said circuit having an output supplied to the first stage of the respective register.

29. A full duplex synchronous cryptographic scrambler responsive to synchronous telegraphy signals and designed to operate with at least 30 different bit rate communication systems comprising an oscillator of standard frequency, means triggered only by said oscillator for selectively generating up to nine different anharmonically related clock pulse frequencies for use in the transmitting and receiving sections of said scrambler; a transmitting section including: means responsive to a selected one of the first clock pulse frequencies for generating first timing pulses having a repetition rate equal to the bit rate of the local binary communication system transmitter signal, means responsive to said first timing pulses for generating a first binary cryptographic key and first mixer means responsive to said first cryptographic key and said local binary communication system signal for generating an enciphered binary signal for transmission to a remote station, said first cryptographic key generating means being continuously responsive to said first timing pulses during operation of the system, said first key and said local signal being in synchronism as applied to said first mixer means so that said enciphered and local signals are in synchronism; a receiving section including: means responsive to second clock pulses of the same frequency as the clock pulses of the remote scrambler that is coupled to the local scrambler, means responsive to the selected second clock pulses for generating second timing pulses having a repetition rate equal to the bit rate of said remotely transmitted binary communication system synchronous signal, means responsive to said second timing pulses for generating a synchronous second binary cruptographic key, cryptographic second cryptographic key generating means being continously responsive to said second timing pulses during operation of the system, said second key and said remotely transmitted signal being in synchronism as applied to said second mixer means and mixer means responsive to said second cryptographic key and a remotely transmitted binary communication system signal coupled to the scrambler for generating a synchronous deciphered binary signal for transmission to the local receiving communication apparatus, said deciphered signal being in synchronism with the received remotely transmitted signal.

30. The universal scrambler of claim 29 wherein said clock pulse generator means includes means for selectively deriving clock pulses for synchronous communication systems as follows:
Department of Defense Digital Data Systems (DDDS)—4800, 2400, 1200 and 600 bits per second,
Navy Tactical Data Systems (NTDS)—2226 and 1360 bits per second;
"SAGE" (Air Force) Digital Data System—1300, 1100, and 750 bits per second;
"Digitalized" facsimile—1000 bites per second;
Rixon time-division multiplex system or MUX at 100 wpm—1977, 1483, 988, 494, 371 and 247 bits per second (approximate in all cases);
Rixon MUX at 75 wpm—1516, 1137, 758, 379, 284 and 189 bits per second (approximate in all cases);
Rixon MUX at 60 wpm—1212, 909, 606, 303, 227 and 152 bits per second (approximate in all cases);
Teletype MUX at 100 wpm—1956, 1467, 978, 489, 367 and 245 bits per second (approximate in all cases);
Teletype MUX at 75 wpm—1500, 1125, 750, 375, 281.25 and 187.5 bits per second;
Teletype MUX at 60 wpm—1200, 900, 600, 300, 225 and 150 bits per second.

31. The system of claim 29 wherein each of said cryptographic key generating means includes a plurality of feedback shift register circuits having co-prime numbers of stages, each of said circuits including a logic circuit responsive to the outputs of at least two stages of the respective register, said circuit having an output supplied to the first stage of the respective register.

32. In a synchronous binary cryptographic transmitter responsive to an input telegraphy signal, means for generating a synchronizing binary signal, means for generating one starting signal having a predetermined binary sequence, means for generating timing pulses of substantially predetermined and fixed frequency, means for generating a synchronous binary cryptographic key in response to the timing pulses being applied thereto, switch means for coupling the timing pulses to the means for generating the cryptographic key, said switch means being closed only in response to the starting signal, said cryptographic key generating means being continuously responsive to said timing pulses during operation of the system, means for combining the cryptographic key with the first binary signal to produce a synchronous enciphered binary signal, said key and telegraphy signal being in synchronism as applied to said combining means so that said enciphered and input signals are in synchronism, and means for transmitting said synchronizing, starting and enciphered signals to a receiver.

33. The transmitter of claim 32 wherein said binary sequence is a repeating sequence of 0-0-1-0-0-1.

34. The transmitter of claim 33 wherein said synchronizing binary signal consists of alternate binary zeros and ones.

35. The system of claim 32 wherein each of said cryptographic key generating means includes a plurality of feedback shift register circuits having co-prime numbers of stages, each of said circuits including a logic circuit responsive to the outputs of at least two stages of the respective register, said circuit having an output supplied to the first stage of the respective register.

36. A synchronous binary cryptographic system comprising; a transmitter including: means for generating a synchronizing binary signal, means for generating one starting signal having a predetermined binary sequence, means for generating first timing pulses of substantially predetermined and fixed frequency, means for generating a first synchronous binary cryptographic key in response to the said first timing pulses being applied thereto, switch means for coupling the said first timing pulses to the means for generating the cryptographic key, said switch means being closed only in response to the starting signal, means for combining the cryptographic key with the a locally generated plain text telegraphy signal to produce a synchronous enciphered binary signal, and first means for transmitting the enciphered, starting, and synchronizing binary signals, said first cryptographic key generating means being continuously responsive to said first time pulses during operation of the system, said first key and said locally generated signal being in synchronism as applied to said first combining means so that the enciphered and locally generated signal are in synchronism; a receiver responsive to said signals transmitted, said receiver including means for generating receiver timing pulses of predetermined fixed frequency, means responsive to the received synchronizing pulses for synchronizing said receiver timing pulses with the signals received from the transmitter, means for generating a synchronous receiver binary cryptographic key when the timing pulses are applied thereto, switch means for coupling the timing pulses to the means for generating the receiver cryptographic key in response to the predetermined start sequence being received, and receiver means for combining the received binary enciphered signal with the receiver cryptographic key to derive a synchronous deciphered binary signal, said receiver cryptographic key generating means being continuously responsive to said receiver timing pulses during operation of the system, said receiver key and said received enciphered signal being in synchronism as applied to said second combining means so that said deciphered and received enciphered signals are in synchronism.

37. The system of claim 36 wherein each of said cryptographic key generating means includes a plurality of feedback shift register circuits having co-prime numbers of stages, each of said circuits including a logic circuit responsive to the outputs of at least two stages of the respective register, said circuit having an output supplied to the first stage of the respective register.

38. In a synchronous binary cryptographic transmitter system, means for generating synchronizing timing pulses of predetermined and substantially fixed frequency, means responsive to said timing pulses for generating and transmitting one predetermined binary synchronizing signal, means for generating and transmitting a predetermined sequenced binary starting signal, means for accepting a first synchronous clear text binary input signal, means for generating a synchronous binary cryptographic key when said timing pulses are applied thereto, switch means for coupling said timing pulses to the means for generating the cryptographic key, said switch means being closed in response to the starting signal, said switch remaining closed throughout operation of the transmitter system, means for combining the cryptographic key with the first input binary signal to produce an enciphered synchronous binary signal said key and clear text signal being in synchronism as applied to said combining means so that said enciphered and first signal are in synchronism and means for combining said synchronizing, starting and enciphered signals.

39. In a synchronous binary cryptographic receiver responsive to an input synchronous telegraphy signal, means for generating synchronous timing pulses of predetermined and substantially fixed frequency, means for sensing one predetermined sequence of synchronizing bits in said input signal, means for phase-locking said timing pulses into exact synchronism with said synchronizing bits, means for sensing another predetermined sequence of starting bits in said signal, means for generating a synchronous binary cryptographic key when said timing pulses are applied thereto, switch means for coupling said timing pulses to the means for generating the cryptographic key, said switch means being closed in response to the sensing of said starting signal, said switch means remaining closed throughout the operation of the receiver, and means for combining the cryptographic key with the first input binary signal to produce a deciphered synchronous binary signal.

40. The receiver of claim 39 wherein said unique binary starting signal is a repeating sequence of 0-0-1-0-0-1.

41. The receiver of claim 34 wherein said binary synchronizing signal consists of alternate binary zeros and binary ones.

42. The system of claim 39 wherein each of said cryptographic key generating means includes a plurality of feedback shift register circuits having co-prime numbers of stages, each of said circuits including a logic circuit responsive to the outputs of at least two stages of the respective register, said circuit having an output supplied to the first stage of the respective register.

43. A synchronous binary cryptographic system responsive to a synchronized input telegraphy signal and capable of operating with a multiplicity of different bit rate telegraphy signals comprising a standard frequency oscillation source, frequency divider means responsive to said oscillation source for generating clock pulses of one predetermined frequency selectable from a multiplicity of different predetermined frequencies, the frequency range in which said multiplicity of clock pulses lies being a small percentage of the frequency of the clock pulses derived, each frequency of said multiplicity of clock pulse frequencies being an integral multiple of the frequencies of the input telegraphy signals, frequency divider means responsive to said clock pulses for deriving timing pulses having substantially the same frequency as said input telegraphy signal, means responsive to the timing pulses for generating a synchronous cryptographic key stream, said cryptographic key generating means being continuously responsive to said timing pulses during operation of the system, and mixer means for combining the telegraphy input signal with the cryptographic key to derive another telegraphy signal, said timing pulse generating means including means for adjusting the phase of the timing pulses so that bits of the cryptographic key stream and the telegraphy input signal are applied to said mixer means synchronously.

44. The system of claim 43 wherein said cryptographic key generating means includes a plurality of feedback shift register circuits having co-prime numbers of stages, each of said circuits including a logic circuit responsive to the outputs of at least two stages of the respective register, said circuit having an output supplied to the first stage of the respective register.

* * * * *